(12) United States Patent
Dubeyko et al.

(10) Patent No.: US 11,755,465 B1
(45) Date of Patent: Sep. 12, 2023

(54) METHOD OF SUPERPOSITION OF MULTIPLE COMMANDS EXECUTION

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/816,284

(22) Filed: Jul. 29, 2022

(51) Int. Cl.
*G06F 9/38* (2018.01)
*G06F 9/48* (2006.01)
(Continued)

(52) U.S. Cl.
CPC ........ *G06F 11/3684* (2013.01); *G06F 9/3001* (2013.01); *G06F 9/3012* (2013.01); *G06F 9/30123* (2013.01); *G06F 9/30134* (2013.01); *G06F 9/30189* (2013.01); *G06F 9/3836* (2013.01); *G06F 9/3859* (2013.01); *G06F 9/3861* (2013.01); *G06F 9/3889* (2013.01);
(Continued)

(58) Field of Classification Search
CPC .... G06F 9/3001; G06F 9/3885; G06F 9/3802; G06F 9/30134; G06F 9/3867; G06F 9/3887; G06F 11/3684; G06F 11/073; G06F 3/0679; G06F 9/3836; G06F 9/3859; G06F 9/30189; G06F 9/30123; G06F 9/3889; G06F 9/3012; G06F 9/3861; G06F 9/4881; G06F 9/485; G06F 11/1004; G06F 11/1068

See application file for complete search history.

(56) References Cited

U.S. PATENT DOCUMENTS

| | | | | |
|---|---|---|---|---|
| 5,539,898 A | * | 7/1996 | Trevett | G06F 15/173 711/147 |
| 5,774,133 A | * | 6/1998 | Neave | G06T 17/00 345/503 |

(Continued)

OTHER PUBLICATIONS

Isaac Gelado et al., An Asymmetric Distributed Shared Memory Model for Heterogeneous Parallel Systems, 2010, [Retrieved on Apr. 10, 2023], Retrieved from the internet: <URL: https://dl.acm.org/doi/pdf/10.1145/1736020.1736059> 12 Pages (347-358) (Year: 2010).*

*Primary Examiner* — Anibal Rivera
(74) *Attorney, Agent, or Firm* — Faegre Drinker Biddle & Reath LLP

(57) ABSTRACT

In a method for superposition of multiple commands, one or more memory pages is received. The one or more memory pages include information corresponding to one or more code lines and one or more data lines. The one or more code lines correspond to a first set of layers in a memory layer and are configured to execute one or more functions. The one or more data lines correspond to a second set of layers in the memory layer and are configured to store one or more sets of data. Each of the one or more code lines from the one or more memory pages is executed to perform one or more corresponding functions, based on the one or more data lines from the one or more memory pages. A result of each of the one or more functions is stored within the one or more data lines.

20 Claims, 17 Drawing Sheets

(51) Int. Cl.
*G06F 9/50* (2006.01)
*G06F 11/36* (2006.01)
*G06F 9/30* (2018.01)
*G06F 11/10* (2006.01)

(52) U.S. Cl.
CPC ............ *G06F 9/485* (2013.01); *G06F 9/4881* (2013.01); *G06F 11/1004* (2013.01); *G06F 11/1068* (2013.01)

(56) References Cited

U.S. PATENT DOCUMENTS

| | | | | |
|---|---|---|---|---|
| 2019/0163493 A1* | 5/2019 | Dubeyko | ............... | G06F 9/5005 |
| 2019/0377580 A1* | 12/2019 | Vorbach | .............. | G06F 9/30105 |
| 2020/0004677 A1* | 1/2020 | Firoozshahian | ...... | G06F 3/0679 |
| 2021/0248094 A1* | 8/2021 | Norman | .................. | G06F 12/10 |

* cited by examiner

METHOD OF SUPERPOSITION OF MULTIPLE COMMANDS EXECUTION

BACKGROUND

A majority of computer readable instructions that are executed by a computing device are operations that move data. Therefore, a majority of power consumption is spent not on performing relevant computations, but rather, on moving data between a processing core and memory of the computing device. Such inefficiencies reduce performance of metadata and user data operations and can shorten the lifetime of computing device memory on which a relatively high amount of read and write instructions are being performed.

It is with respect to these and other general considerations that aspects of the present disclosure have been described. Also, although relatively specific problems have been discussed, it should be understood that the embodiments disclosed herein should not be limited to solving the specific problems identified in the background.

SUMMARY

Aspects of the present disclosure relate to methods, system, and media for offloading data processing into computational storage.

In one aspect of the present disclosure, a system for superposition of multiple commands is provided. The system comprises a logic layer comprising an arithmetic logic unit (ALU); and a memory layer comprising a first set of layers and a second set of layers, the first set of layers corresponding to one or more code lines, the one or more code lines being configured to execute one or more functions, and the second set of layers corresponding to one or more data lines, the one or more data lines being configured to store one or more sets of data. The memory layer stores instructions that, when executed by the logic layer, cause the system to perform a first set of operations, the first set of operations comprising: receiving one or more memory pages including information corresponding to one or more of the one or more code lines and one or more of the one or more data lines; executing each of the one or more of the one or more code lines from the one or more memory pages, to perform one or more corresponding functions, based on the one or more of the one or more data lines from the one or more memory pages; and storing a result of each of the one or more functions, within the one or more data lines.

In another aspect, a method for superposition of multiple commands is provided. The method comprises: receiving one or more memory pages including information corresponding to one or more code lines and one or more data lines, the one or more code lines corresponding to a first set of layers in a memory layer and being configured to execute one or more functions, and the one or more data lines corresponding to a second set of layers in the memory layer and being configured to store one or more sets of data; executing each of the one or more code lines from the one or more memory pages, to perform one or more corresponding functions, based on the one or more data lines from the one or more memory pages; and storing a result of each of the one or more functions, within the one or more data lines.

In another aspect, a non-transitory computer-readable storage medium is provided. The non-transitory computer-readable storage medium stores computer-readable instructions that upon execution by a processor cause the processor to implement operations comprising: receiving one or more memory pages including information corresponding to one or more code lines and one or more data lines, the one or more code lines corresponding to a first set of layers in a memory layer and being configured to execute one or more functions, and the one or more data lines corresponding to a second set of layers in the memory layer and being configured to store one or more sets of data; executing each of the one or more code lines from the one or more memory pages, to perform one or more corresponding functions, based on the one or more data lines from the one or more memory pages; and storing a result of each of the one or more functions, within the one or more data lines.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
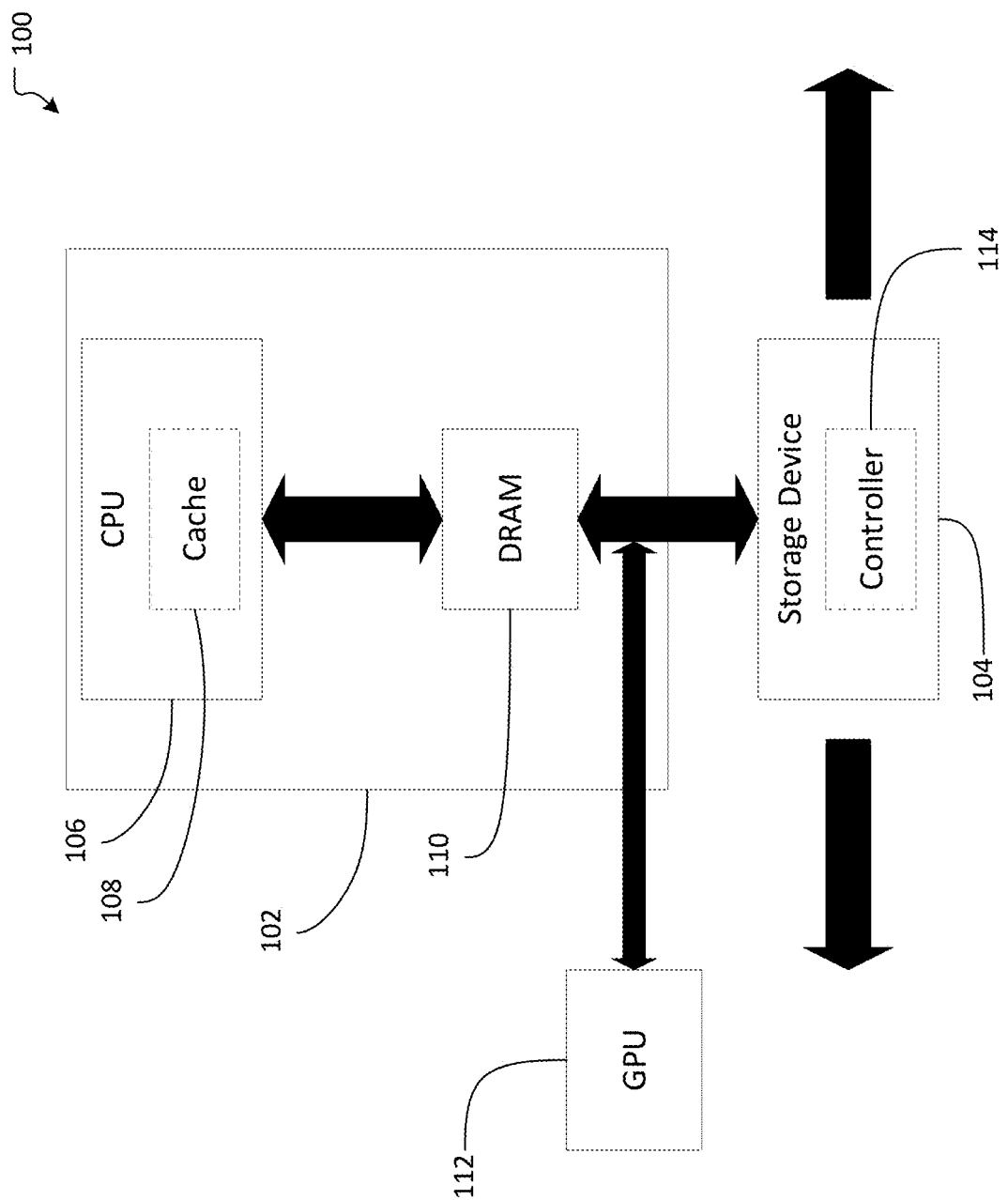
FIG. 1 illustrates an overview of a conventional system without computational storage.

In the following Detailed Description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Various examples illustrating aspects of the present disclosure are described herein. Across examples, components may be described with similar names (e.g., journal, core, zone, NAND die or die, volume, file system, etc.). It should be recognized that components with similar names, and described in different examples, may be capable of performing similar functions or interacting with other components in similar manners. Alternatively, in some examples, components with similar names, and described in different examples, may be capable of performing different functions or interacting with different components than the earlier/later described components with the similar names.

As mentioned above, a majority of computer readable instructions that are executed by a computing device are operations that move data. Therefore, a majority of power consumption of a computing device is spent not on performing relevant computations, but rather on moving data between a processing core and memory of the computing device. Such inefficiencies reduce performance of metadata and user data operations and can shorten the lifetime of computing device memory on which a relatively high amount of read and write instructions are being performed.

The rise of big data sets in industry and the need for larger memory volumes in computing technology applications have created inefficiencies in data processing that are time-consuming and power consuming. Generally speaking, 60-80% of machine instructions are operations that move data from one location to another location. Therefore, the majority of power consumption in a data processing system is spent not on relevant computations, but rather on moving data and/or instructions between a processing core and memory.

Central processing unit (CPU) caches may improve data processing performance, but as a side effect, the caches need to employ complicated cache coherence protocols to achieve a consistent view of data in memory, using cores of the central processing unit. Further, CPU caches may be built on static random-access memory (SRAM) that is relatively fast, but also consumes a relatively large quantity of power. Dynamic random-access memory (DRAM) can also consume a relatively large quantity of power (e.g., since cells of DRAM are refreshed every 64 to 32 milliseconds to keep data). So, increasing a capacity of DRAM or CPU cache size can result in an increase in power consumption. On the other hand, persistent memory does not need to refresh memory cells and is therefore much more power-efficient. Some computing systems require moving data from persistent storage into DRAM with the goal to access and process data by CPU cores. Persistent memory technologies continue to become faster for computations; however, modern computing systems negate the advantages being made in persistent memory technologies because of known drawbacks.

File storage systems may contain information that is stored in persistent memory of the associated storage devices. For a host device to perform actions that are based on the information stored in the persistent memory of the associated storage device, the information has to first be retrieved from the persistent memory (e.g., a read operation needs to be performed) of the storage device into DRAM on the host side, then the CPU core on the host side can execute some function (execute some computation) based on the retrieved information. The result of the computation executed by the CPU core on the host side then must be stored from the DRAM on the host side into the persistent memory of the storage device. Using such conventional implementations not only requires extensive data moving and/or data exchange operations between the host device and the storage device, but also requires extensive moving operations between the DRAM and L caches of the CPU cores on the host side.

Aspects of the present disclosure address the above-mentioned deficiencies, in addition to further benefits which may be recognized by those of ordinary skill in the art. For example, using systems and mechanisms described herein, data processing can be offloaded from a host device to a storage device (e.g., a computational storage device). Accordingly, data and metadata can be processed in persistent memory space, without depleting computational resources of the host device. Generally, methods and systems disclosed herein provide powerful techniques to offload data processing onto a computational storage device that interacts with a host device.

More specifically, the systems and mechanisms disclosed herein are designed with the aim of avoiding or minimizing any moving operations. For example, a field-programmable gate array (FPGA), application-specific integrated circuit (ASIC), or RISC-V core(s) may process data directed in MRAM or any other byte-addressable persistent memory (e.g., MRAM, ReRAM, etc.) without the need to copy the data into another type of memory. Even for NAND flash, the methods and system disclosed herein make it possible to implement READ-ONLY operations (e.g., search) without having to copy into another type of memory. However, if it becomes necessary to modify data in-place, MRAM provides a way to do so without any copy operation, while NAND flash requires copying into another type of memory (e.g., DRAM or MRAM), executing data modification in this other type of memory, and storing the result into another (clean) NAND flash page. Some additional advantages may be that: (1) data moving operation on a host side are excluded, (2) data processing inside of computational storage can be executed by multiple FPGA cores in parallel, and (3) results of operation, such as computational operations, can be stored into persistent memory by a computational storage device itself. All of these points improve performance because a host device does not spend resources on data moving and computation operations.

FIG. 1 illustrates an overview of a conventional system 100 without computational storage. The system 100 includes a host device 102 and a storage device 104 (e.g., a solid-state drive (SSD) or a hard disk drive (HDD)). The host device 102 may be coupled to, or otherwise in communication with, the storage device 104. The host device 102 includes a processor 106 (e.g., a central processing unit (CPU)). The processor 106 may include a cache 108. The cache 108 may store a local copy of data that is used by the processor 106 for executing functions for host device 102. The host device 102 further includes memory 110 (e.g., dynamic random-access memory (DRAM)). The processor 106 may be coupled to and/or in communication with the memory 110 to execute read and/or write instructions for data operations. The host device 102 may further be in communication with and/or include a graphical processing unit (GPU) 112. The graphical processing unit 112 may also be coupled to and/or in communication with the memory 110 to execute read and/or write instructions for data operations. The storage device 104 further includes a controller 114.

A controller, as described with respect to conventional systems discussed herein, refers to a system that may include a component, such as an application-specific integrated circuit (ASIC), that manages read and/or write operations using input-output (I/O) systems. The combination of a controller and persistent memory, as discussed with respect to FIG. 1, differs from computational storage devices discussed below, at least because a computational storage device utilizes a computational component to perform computations, or other processing, on data that is already stored in the computational storage device. That is, the computational storage device can receive instructions to process, or perform computations, on the data in the computational storage device that is already stored at the computational storage device. As an example, one or more instructions may be sent to the computational storage device to execute some computation inside of computational storage device on data that is already stored at the computational storage device. Such data may be stored or provided to the computational storage device by means of standard I/O operations from a host or controller; however, the computational storage device is configured to receive one or more instructions, from the host for example, and perform a computation on the data, where the computation goes beyond accessing, moving, or storing the data. For example, the computational storage device may perform computations, including but not limited to Boolean computations, arithmetic computations, logical computations, interference computations, etc. Alternatively, or in addition, if data is stored at the host side then, such computations may be performed at the host side. However, if the data is already stored in the computational storage device, then from a computation and efficiency perspective, it makes sense to offload the computation by performing the computations via the computational storage device. In examples, a computational storage device may include a field-programmable gate array (FPGA), ASIC, or RISC-V to perform such computations. There are a number of possible ways to offload computation to a computational storage device. In one example, the host can send the whole algorithm (or executable binary) to computational storage. In another example, the algorithm or executable binary can already be stored in computational storage and the host need only identify the executable binary by means of sending a name or ID of the executable binary to execute the algorithm. In yet another example, an FPGA core can implement logic/algorithm on a hardware level and the host need only send an identification of the FPGA core to execute the algorithm.

Aspects of the system 100 may exemplify common issues that are faced using conventional data storage methods. For example, caches (e.g., cache 108) may experience cache coherence problems where data that is stored across multiple local caches are not properly synchronized as the processor 106 updates local copies of data (e.g., after performing write and/or update operations). Further, memory (e.g., memory 110) may face a memory wall problem, such as occurs when the rate of improvement of processor performance far exceeds the rate of improvement in DRAM memory speed. Memory wall problems can be a performance bottleneck in systems operations. The system 100 may experience a throughput bottleneck as data is transferred between the host device 102 to the storage device 104. A throughput bottleneck can limit productivity and efficiency of the system 100.

System 100 may further experience data moving problems when transmitting data between the host device 102 (e.g., from memory 110) and the GPU 112. For example, transmitting data between the host device and GPU 112 may create a power consumption problem where the GPU demands a relatively large or undesirable amount of power from system 100 to receive, and/or perform operations using, data from the host device 102. Excessive data movement can reduce the lifetime of hardware components that store data (e.g., an SSD or HDD), in addition to reducing the efficiency of a system in which the data movement is occurring (e.g., system 100). Therefore, it may be beneficial to implement systems and methods in which data movement is reduced to perform desired actions or computations.

System 100 may further experience excess controller overhead at controller 114 when the controller 114 is used to manage a relatively large amount of data operations. Generally, the storage device 104 may experience big data problems, in which relatively large amounts of data and/or metadata are stored on the storage device 104.

Figure 2:
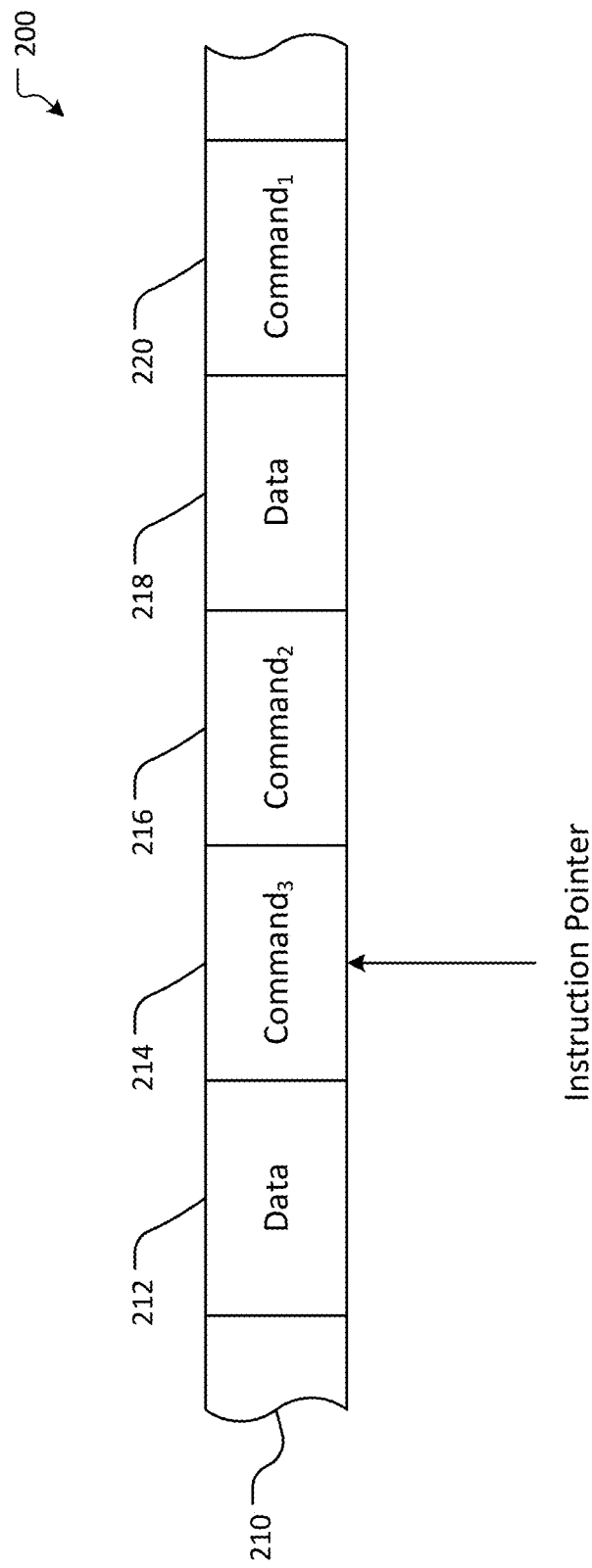
FIG. 2 is a schematic diagram illustrating a simplified process of a Turing machine.

FIG. 2 is a schematic diagram illustrating a simplified process 200 of a Turing machine. A Turing machine is a mathematical model of computation that defines an abstract machine that manipulates symbols on a strip of tape 210 according to a table of rules. Despite the simplicity of the model, given any computer algorithm, a Turing machine capable of implementing that algorithm's logic can be constructed. The machine operates on an infinite memory tape divided into discrete "cells" 212, 214, 216, 218, and 220. The machine positions its "head" over a cell (e.g., cell 212) and "reads" or "scans" the symbol there. Then, based on the symbol and the machine's own present state in a "finite table" of user-specified instructions, the machine first writes a symbol (e.g., a digit or a letter from a finite alphabet) in the cell (some models allow symbol erasure or no writing) then either moves the tape one cell to the left or right (some models allow no motion, some models move the head). Based on the observed symbol and the machine's own state in the table, the machine then either proceeds to another instruction or halts computation.

Figure 3:
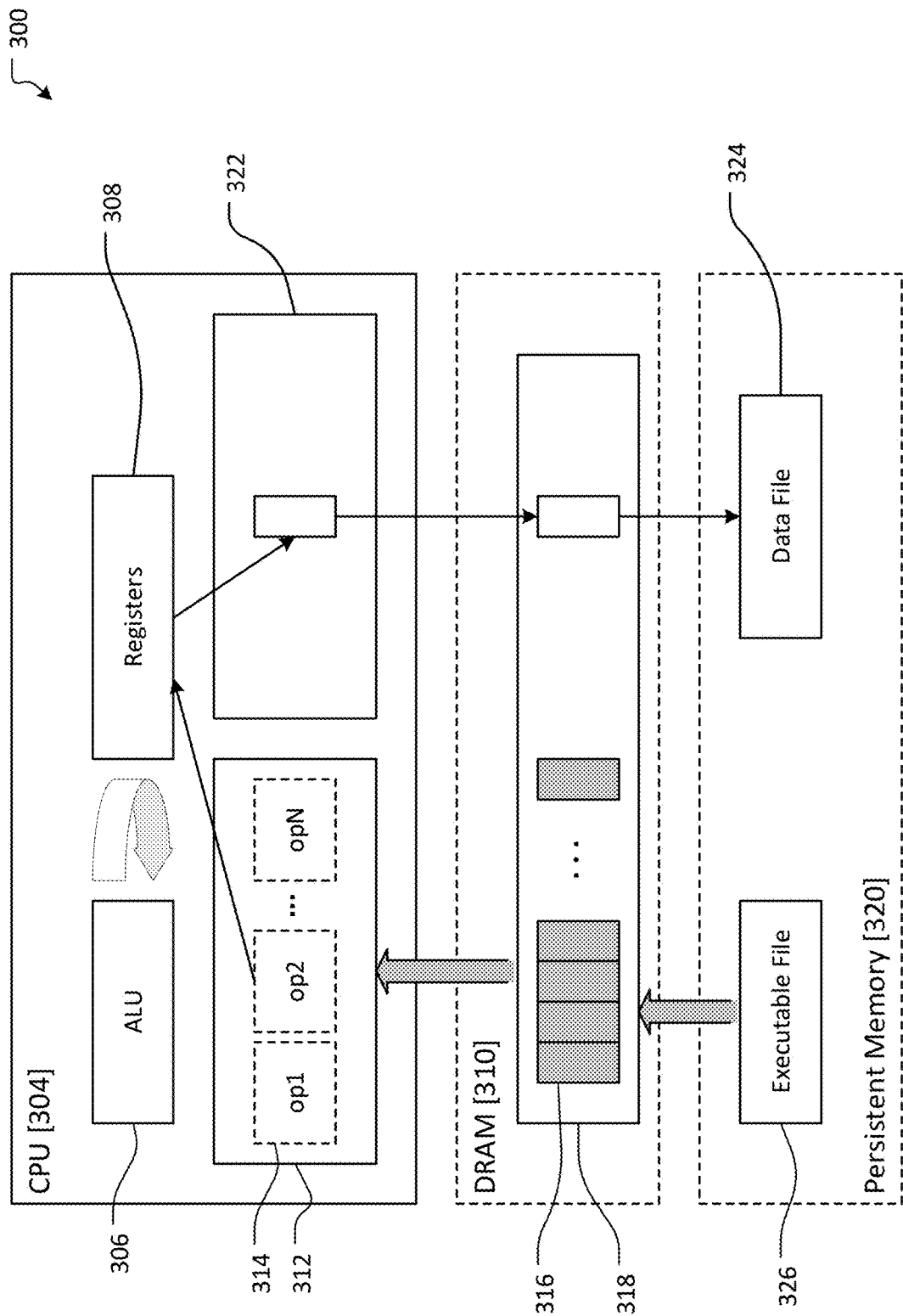
FIG. 3 illustrates an overview of a conventional system for computation.

FIG. 3 illustrates an overview of a conventional system for computation. The example system 300 is based on the Turing machine paradigm described above. The example system 300 may include CPU 304, DRAM 310, and persistent memory 320. CPU 304 may include, for example, Arithmetic Logic Unit (ALU) 306, Registers 308, instruction cache 312, and data cache 322. In the example system 300, executable code 326 and data 324 may be stored in persistent memory 320, which may be, for example, a hard disk drive (HDD) or a solid-state drive (SSD). In the scenario of running an application, image of a process 318 may be prefetched from persistent memory 320 into DRAM 310 and corresponding code/data 316 may be prefetched from persistent memory 320 into the address space of the created process/thread 318. For example, the operating system (OS) may fork or make a copy of any other existing process in DRAM 310, and then a binary image of the application may be prefetched or copied from persistent memory 320 into the address space of the process created in DRAM by means of the aforementioned fork operation. A task scheduler may assign the CPU's 304 time slices for existing processes/threads in the system 300. If a process receives a time slice for execution, then the state of the process and executable code are copied from the DRAM 310 into the CPU's 304 instruction cache 312. The Turing machine model is used to execute instructions from the instruction cache 312. As a result, generated or modified data is stored into a data cache 322 that is used as temporary memory to flush the result of computation into persistent memory 320. For example, data cache 322 may be flushed into DRAM at first, and then data cache could be ultimately flushed into persistent memory 320 as part of some file.

While the computation paradigm described above with respect to the example system 300 of FIG. 3 is robust and very mature, it introduces a significant number of drawbacks. For example, cache coherence, memory wall, and data moving problems are all signs that a new approach is needed for the computation paradigm.

As described above, the widely used computational paradigm is based on data movement instructions. Every application includes around 60%-80% of moving instructions. As a result, real computation instructions represent only a small fraction of application activity. This means that computer systems spend a major portion of power not for computation purposes but for moving data. Furthermore, a significant amount of moving operations acts as a critical bottleneck to achieving easy performance improvement.

Graph processing is a popular use-case with very critical requirements related to memory and computation power. Key bottlenecks in graph processing (especially a large graph) include, but are not limited to, (1) frequent random memory accesses, and (2) small amount of computation. In general, the ideal environment for graph processing is a very large memory space with a very large amount of embedded simple computation cores. The explosion of digital data and the ever-growing need for fast data analysis have made in-memory big-data processing in computer systems increasingly important. In particular, large-scale graph processing is gaining attention due to its broad applicability from social science to machine learning. However, a scalable hardware design that can efficiently process large graphs in main memory remains an ongoing problem. Ideally, cost-effective and scalable graph processing systems can be realized by building a system in which performance increases proportionally with the sizes of graphs that can be stored in the system. This is extremely challenging in conventional systems due to severe memory bandwidth limitations.

Figure 4:
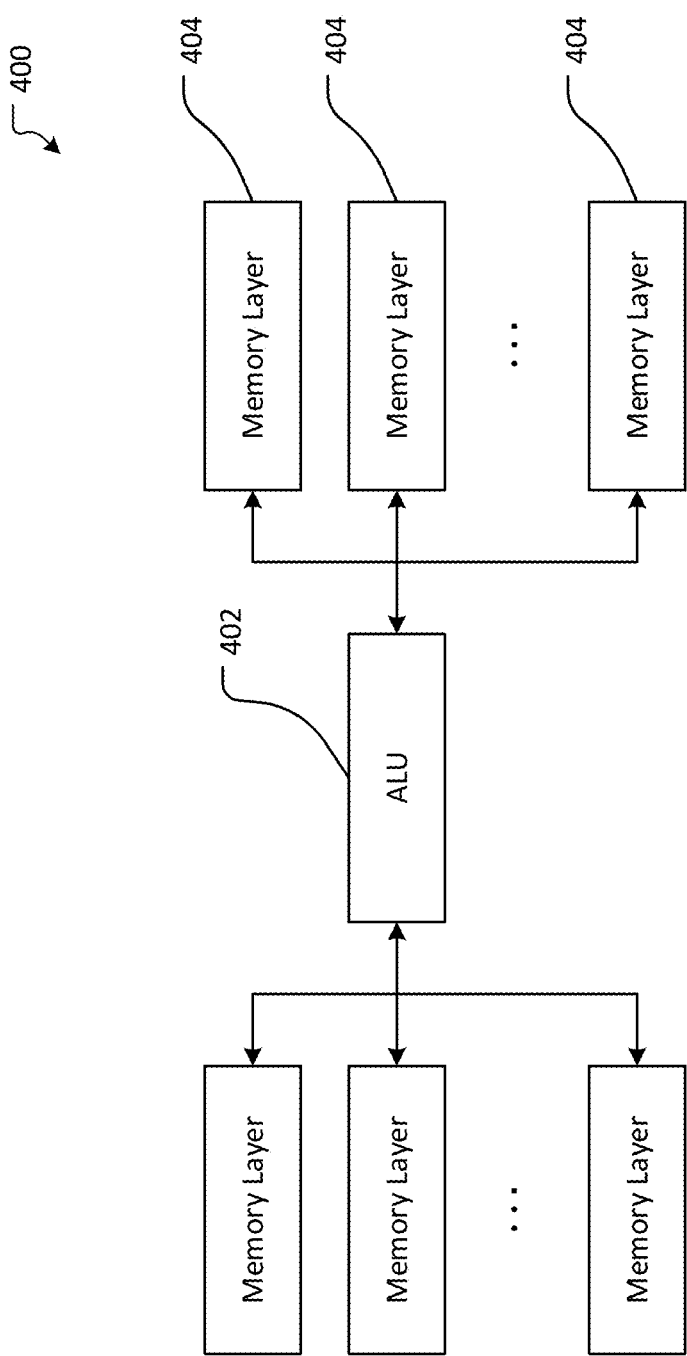
FIG. 4 is a schematic diagram illustrating a high-level overview of an example memory system architecture for superposition of multiple commands, in accordance with some aspects described herein.

FIG. 4 is a schematic diagram illustrating a high-level overview of an example memory system architecture for superposition of multiple commands, in accordance with some aspects described herein. In the example system architecture 400, an arithmetic logic unit (ALU) 402 is connected with a plurality of memory layers 404. It should be noted that this 3-dimensional (3D) architecture provides a variety of important opportunities. For example, suppose that every layer of persistent memory from the left side keeps different algorithms, while layers on the right side of persistent memory keep data. It would thus be possible to apply different algorithms from the layers on the left side of persistent memory to the data in the layers on the right side at different points in time. It is also possible to share the same ALU 402 among different algorithms execution. This is possible, for example, by simultaneously executing several algorithms for different data lines by means of distributing time slices of ALU between different algorithms execution.

Figure 5:
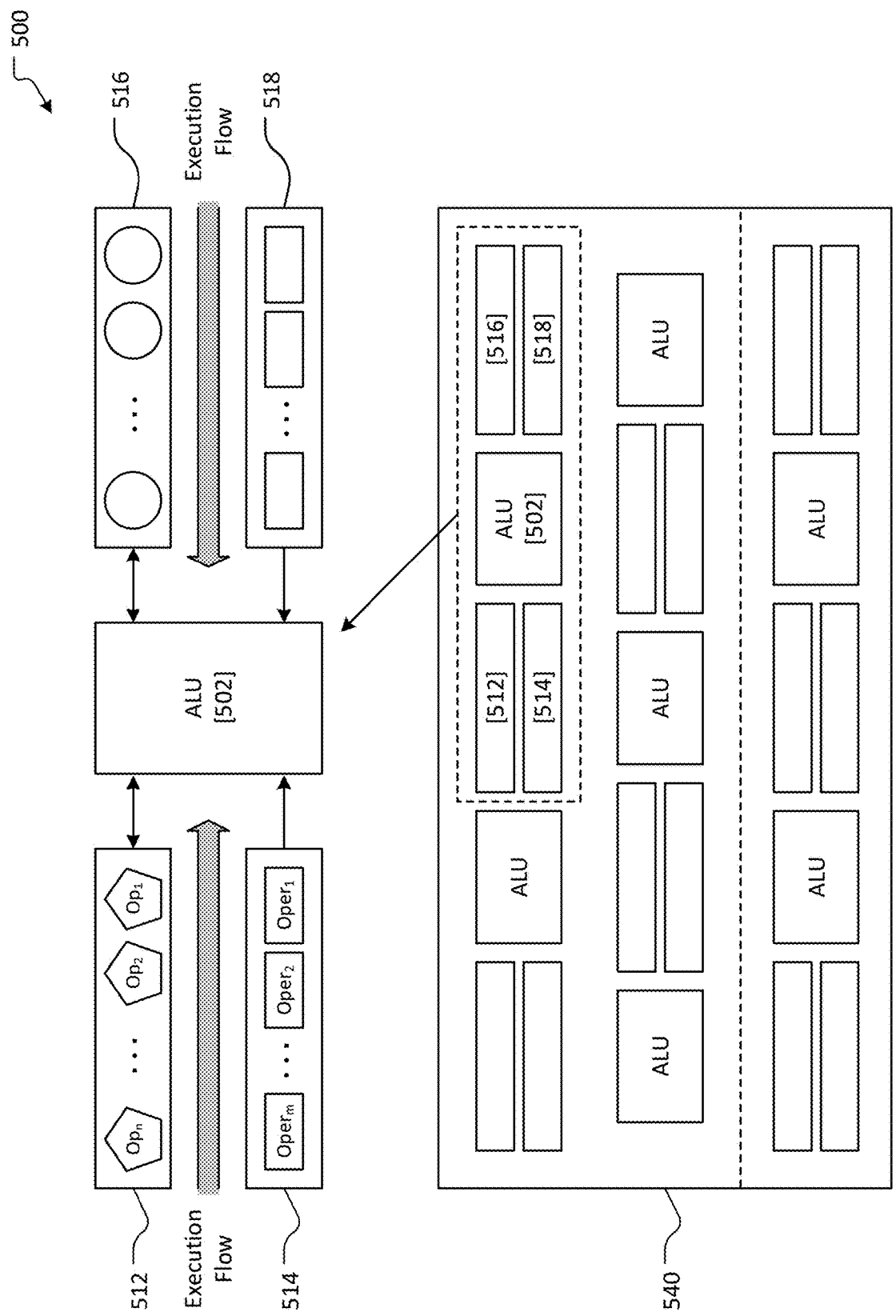
FIG. 5 illustrates an overview of an example memory system architecture 500 for superposition of multiple commands, in accordance with some aspects described herein.

FIG. 5 illustrates an overview of an example memory system architecture 500 for superposition of multiple commands, in accordance with some aspects described herein. A CPU core typically includes an L cache and complex management logic. It is this complexity that creates bottlenecks and excessive power consumption. However, as will described in greater detail below, a simplified architecture is possible that is capable of implementing a superposition of classical calculations. In conventional systems, a CPU core includes an ALU, a management unit, and registers to implement execution of application logic. Initially, code and data are kept in DRAM memory. A portion of code/data needs to be prefetched into L cache, and then current instruction can be placed into the register and be executed by the ALU. But what conventional systems do not reflect is that memory itself can be used as registers that can be accessed by the ALU directly. However, if the ALU accesses memory directly, then the ALU needs to decrease frequency (speed of calculations). In accordance with aspects described herein, if the ALU can operate by code directly in memory then it is possible to significantly decrease the number of transistors used to build one core. As a result, it is possible to combine multiple ALU cores with memory lines in one chip. Such a configuration is shown in the example system 500 of FIG. 5, where multiple ALU cores 502 are combined with memory lines (e.g., memory lines 512, 514, 516, and 518) in a single chip 540.

As reflected in the example system 500, neuromorphic memory could be a space comprising a combination of memory lines (e.g., data line 512 or 516 and code line 514 or 518) and ALU arrays (e.g., arrays of ALU 502). Data line 512 may include a plurality of operands ($Op_1$, $Op_2$, up through $Op_n$, where n is a whole integer), and code line 514 may include a plurality of operations ($Oper_1$, $Oper_2$, up through $Oper_m$, where m is a whole integer). In one example, the operation of placing some binary streams in particular data/code lines (e.g., data line 512 or 516 and code line 514 or 518) initiates the code execution by ALU 502. It should be noted that the neuromorphic memory may still look like a memory in the sense that placing code into the memory will run the execution (data processing) activity in some or all memory areas. In one example, a write operation may initiate execution. In another example, code and data may already be stored in the data/code lines (e.g., data line 512 or 516 and code line 514 or 518) and special signals on the chip's line(s) can select the data/code lines for execution. In yet another example, a special management code line could receive code that identifies another data/code line that needs to be executed. In system 500, the very large number of execution areas means that a massive amount of data processing activity takes place in superposition with one another.

In an embodiment, persistent memory (e.g., persistent memory 320 in the example system 300 of FIG. 3) is used as memory lines (e.g., memory lines 512, 514, 516, and 518) that ALU 502 can access. In an example, a write operation into memory may be used to identify the code memory lines (e.g., code lines 514 and 518) and data memory lines (e.g., data line 512) that need to be associated to execute the logic of the algorithm(s). Moreover, the ALU core 502 can be connected with multiple memory layers (e.g., memory layers 404 in FIG. 4) and can apply different functions/code (e.g., located in different memory layers) to the same data line (e.g., data line 512). Additionally, ALU 502 may combine the execution of several algorithms applied to different data lines (e.g., data line 512) by scheduling and distributing time slices among the algorithms. Through superposition of the conventional calculations approach, it is possible to implement massive parallel data processing in memory by using a straightforward management model.

Figure 6:
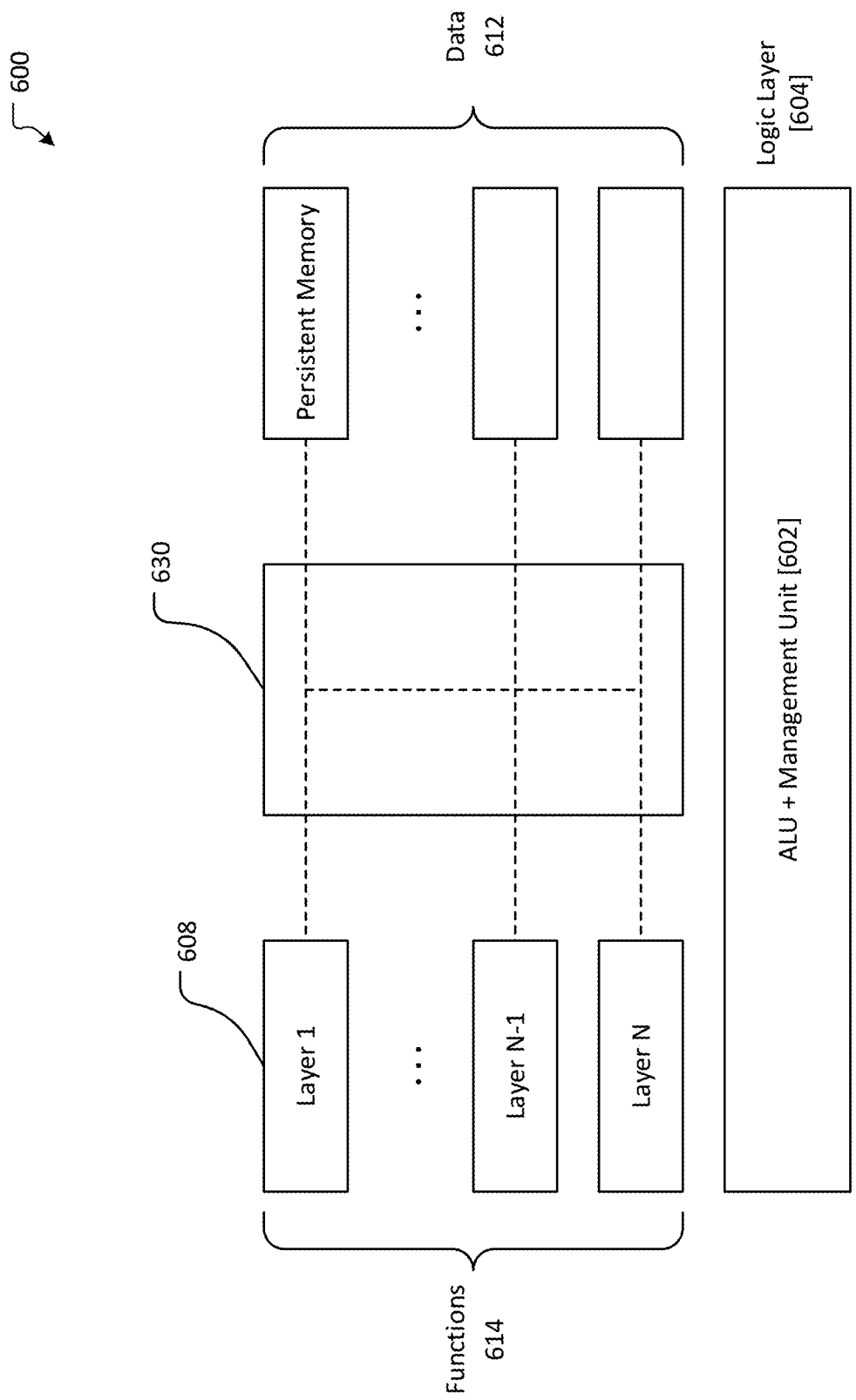
FIG. 6 illustrates an overview of an example memory system architecture 600 for superposition of multiple commands, in accordance with some aspects described herein.

FIG. 6 illustrates an overview of an example memory system architecture 600 for superposition of multiple commands, in accordance with some aspects described herein. Aspects of example system architecture 600 may be similar to corresponding aspects of example system architecture 500 shown in FIG. 5 and described in detail above. The example system architecture 600 is comprised of multiple layers, including a first layer (or logic layer) 604 that can implement ALU and management logic (e.g., ALU and Management Unit 602), and a plurality of upper layers 608 (e.g., Layer 1, Layer N−1, Layer N, etc., where N represents a whole integer). In one example, the plurality of upper layers 608 may represent memory layers (e.g., memory layers 404 in FIG. 4) and interconnection network 630. In an example, a first set of upper layers 608 may be designated as functions (code) layers 614 and configured to keep code or functions (e.g., code lines 514 and 518 in FIG. 5), while a second set of upper layers 608 may be designated as data layers 612 and configured to keep data portions (e.g., data line 512). As shown in the example architecture 600, the ALU and Management Unit 602 may be connected to the memory layers 608 through the interconnection network 630. In an example, management logic 602 may receive an identification of a code line (e.g., code line 514 or 518) and data line (e.g., data line 512) in order to execute a function (code line) that is to be applied on the data line. The identification information may be represented, for example, by requests that are stored into a dedicated memory line (e.g., a queue). The management logic 602 may be configured to retrieve the request from the queue and execute the logic of the algorithm(s) stored in the code lines.

Figure 7:
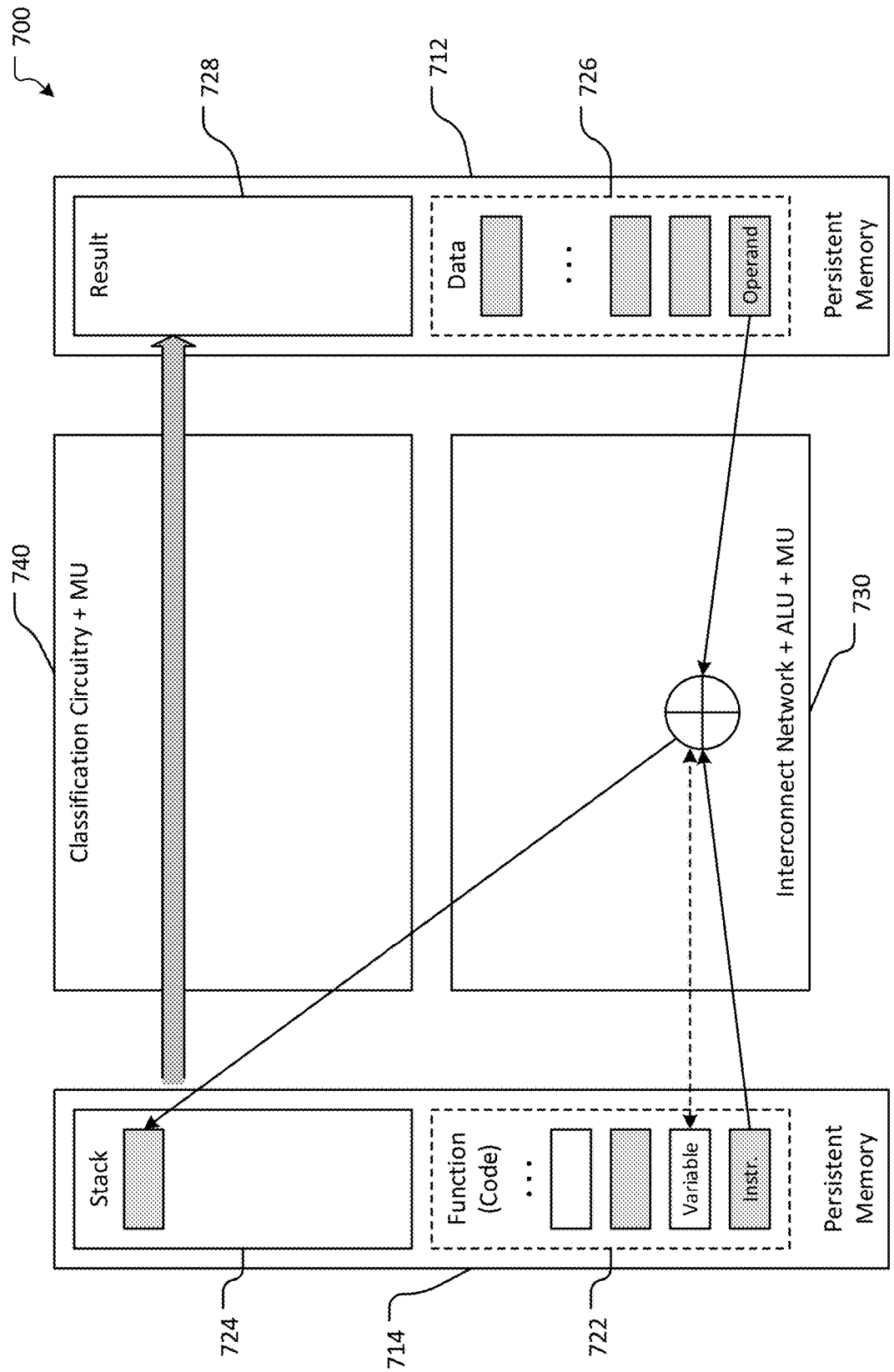
FIG. 7 illustrates an overview of an example memory system architecture for superposition of multiple commands, in accordance with some aspects described herein.

FIG. 7 illustrates an overview of an example memory system architecture 700 for superposition of multiple commands, in accordance with some aspects described herein. Aspects of example system architecture 700 may be similar to corresponding aspects of example system architectures 500 and 600 shown in FIGS. 5 and 6 and described in detail above. The example system architecture 700 may include data line 712, code line 714, classification circuitry and management unit (MU) 740, and interconnect network (including ALU and MU) 730. In one example, code line 714 may represent a mini process space that includes code instructions area 722 and stack 724. Stack 724 may be used to keep temporary variables, subfunctions state, result(s) during algorithm logic execution, and the like. In an example, data line 712 may represent an input data stream 726 that needs to be processed by an algorithm and may include a result area 728. In one example, an algorithm may represent logic that is to be applied to every item in the data line 712. In another example, an algorithm may implement logic that can be applied to every item in the data line 712 in a parallel manner. The stack 724 in code line 714 may receive the output data following the execution of the algorithm. The output data may be classified (e.g., via classification circuitry 740) or simply stored into the result area 728 of the data line 712. In one example, the results area 728 of the data line 712 may temporarily hold the output data until the output data is either stored into a dedicated data line or deleted as a temporary result.

Figure 8:
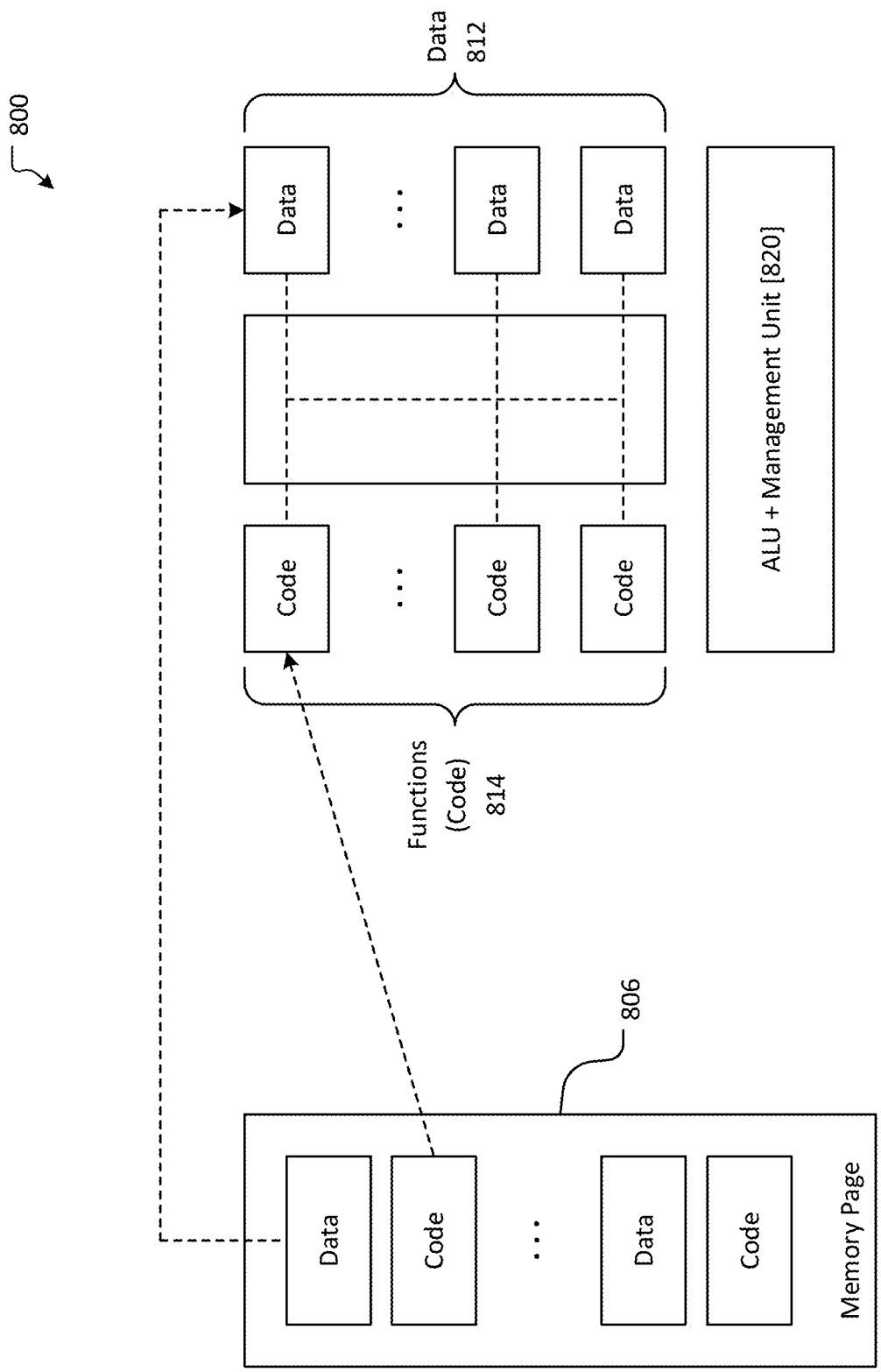
FIG. 8 is a schematic diagram illustrating an example model of preparing code and data in a memory page, according to some aspects described herein.

FIG. 8 is a schematic diagram illustrating an example model 800 of preparing code and data in a memory page, according to some aspects described herein. In accordance with some examples, neuromorphic memory may require a particular model of preparing code and data in a memory page 806. The example model 800 may be implemented in any of the example system architectures 500, 600, or 700 shown in FIGS. 5-7 and described in detail above. In the example model 800 shown, data lines 812 (e.g., which may be similar to data lines 512, 612, or 712 in FIGS. 5-7, respectively) and code lines 814 (e.g., which may be similar to code lines 514, 614, or 714) are prepared in combination in the same memory page 806. For example, in an embodiment, each data line 812 and code line 814 could be configured to contain 64 bytes (or 128 bytes, etc.). In such a configuration, each data/code line may keep 64 bytes of code or data, which means that a 4K memory page (e.g., memory page 806) could include 32 code lines or 32 data lines (each containing 64 bytes). In one example, a write operation on the memory page 806 may result in storing code and data portions into designated code lines 814 and data lines 812 in a memory system architecture that includes ALU and Management Unit 820. In such an example, hardware circuitry may have a fixed architecture and the compiler may need to prepare the memory page 806 with code lines 814 and data lines 812 aggregated into one memory page. It should be understood that in some examples, the memory page (e.g., memory page 806) could be not only 4K, but also 8K, 2 MB, and so on. Therefore, the number of code and/or data lines could be larger than the examples described above. Also, in some examples, the size of each data and/or code line could vary from the example sizes described above. For example, each data and/or code line could be 1K or could be some other size.

Figure 9:
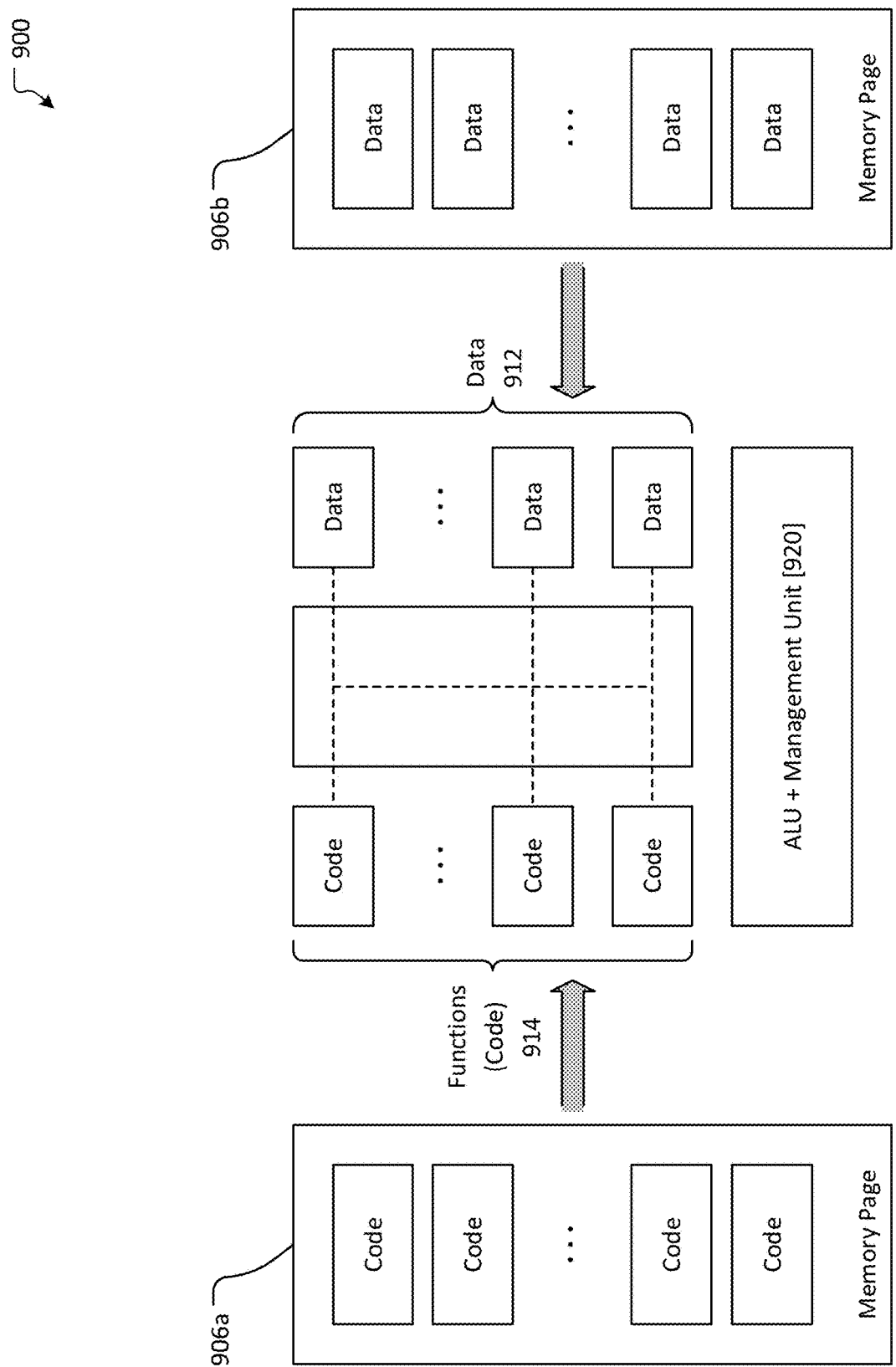
FIG. 9 is a schematic diagram illustrating an example model of preparing code and data in a memory page, according to some aspects described herein.

FIG. 9 is a schematic diagram illustrating an example model of preparing code and data in a memory page, according to some aspects described herein. The example model 900 may be implemented in any of the example system architectures 500, 600, or 700 shown in FIGS. 5-7 and described in detail above. Whereas in the example model 800 (described above with respect to FIG. 8), data lines 812 and code lines 814 are prepared in combination in the same memory page 806, in the example model 900, data lines 912 (e.g., which may be similar to data lines 512, 612, 712, or 812 in FIGS. 5-8, respectively) and code lines 914 (e.g., which may be similar to code lines 514, 614, 714, and 814) are prepared independently in separate memory pages 906a and 906b. For example, in an embodiment, each data line 912 and code line 914 could be configured to contain 64 bytes (or 128 bytes, etc.). In such a configuration, each data/code line may keep 64 bytes of code or data, which means that a 4K memory page (e.g., memory page 906a or 906b) could include 32 code lines or 32 data lines (each containing 64 bytes). In one example, a write operation on the memory page 906a or 906b may result in storing code and data portions into designated code lines 914 and data lines 912 in a memory system architecture that includes ALU and Management Unit 920. In such an example, the hardware circuitry will be responsible for storing code lines 914 and data lines 912 in proper memory areas.

Figure 10:
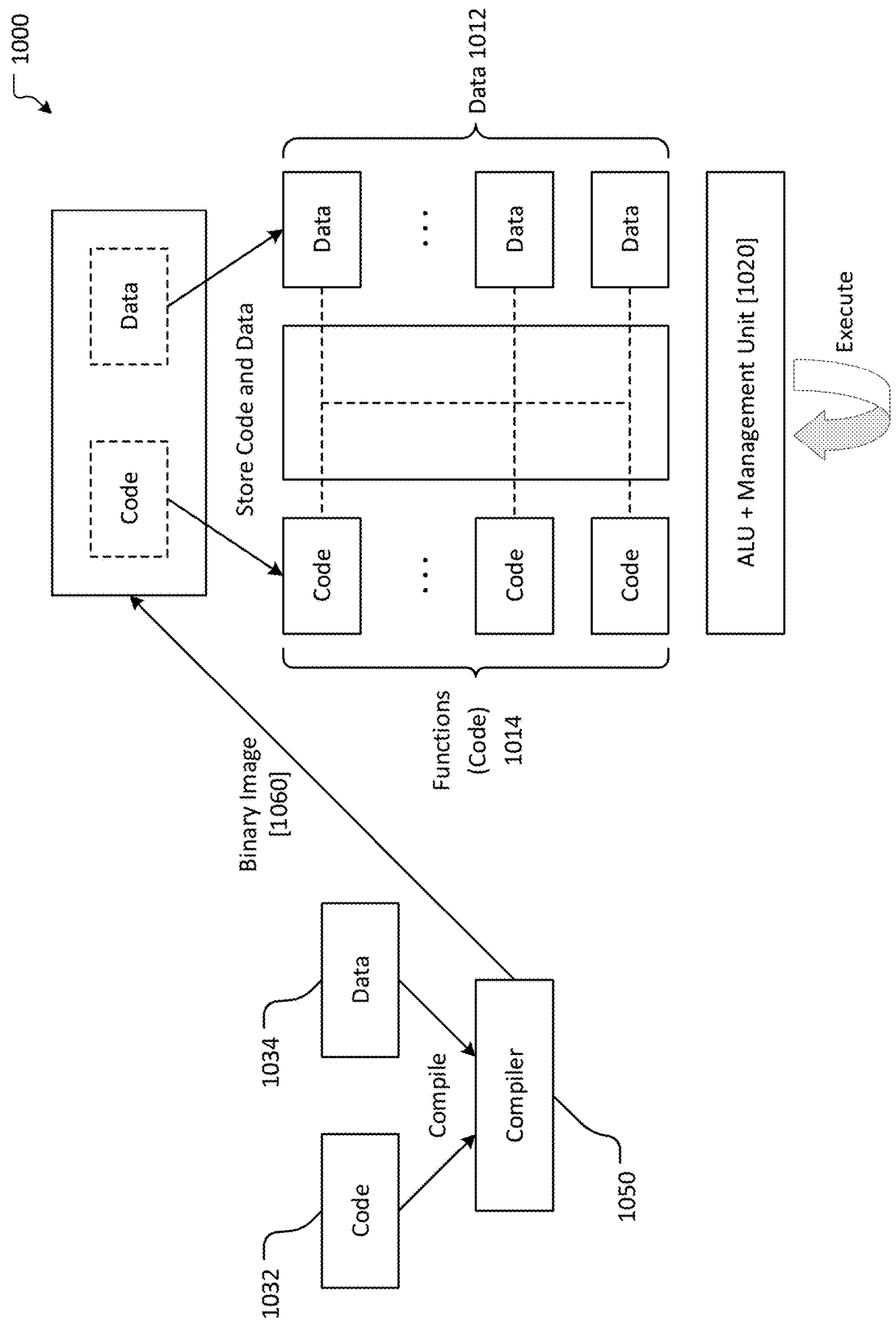
FIG. 10 is a schematic diagram illustrating an example model of data processing execution, according to some aspects described herein.

FIG. 10 is a schematic diagram illustrating an example model 1000 of data processing execution, according to some aspects described herein. The example model 1000 may be implemented in any of the example system architectures 500, 600, or 700 shown in FIGS. 5-7 and described in detail above. In one example, the data processing execution model 1000 is based on a write operation of a prepared binary image 1060 prepared by a compiler 1050. In one example, the compiler 1050 prepares a binary image 1060 that includes a combination of executable code 1032 and data 1034 in every memory page. Memory pages may then be written into neuromorphic memory. In an example, the write operation implies the request of executing code and processing data. In general, the write operation is finished only after ending the code execution in all code lines 1014. It should be noted that the need to combine all code lines 1014 and data lines 1012 in one memory page may cause the example model 1000 to less flexible since the model needs to compile a memory page for all new data.

Figure 11:
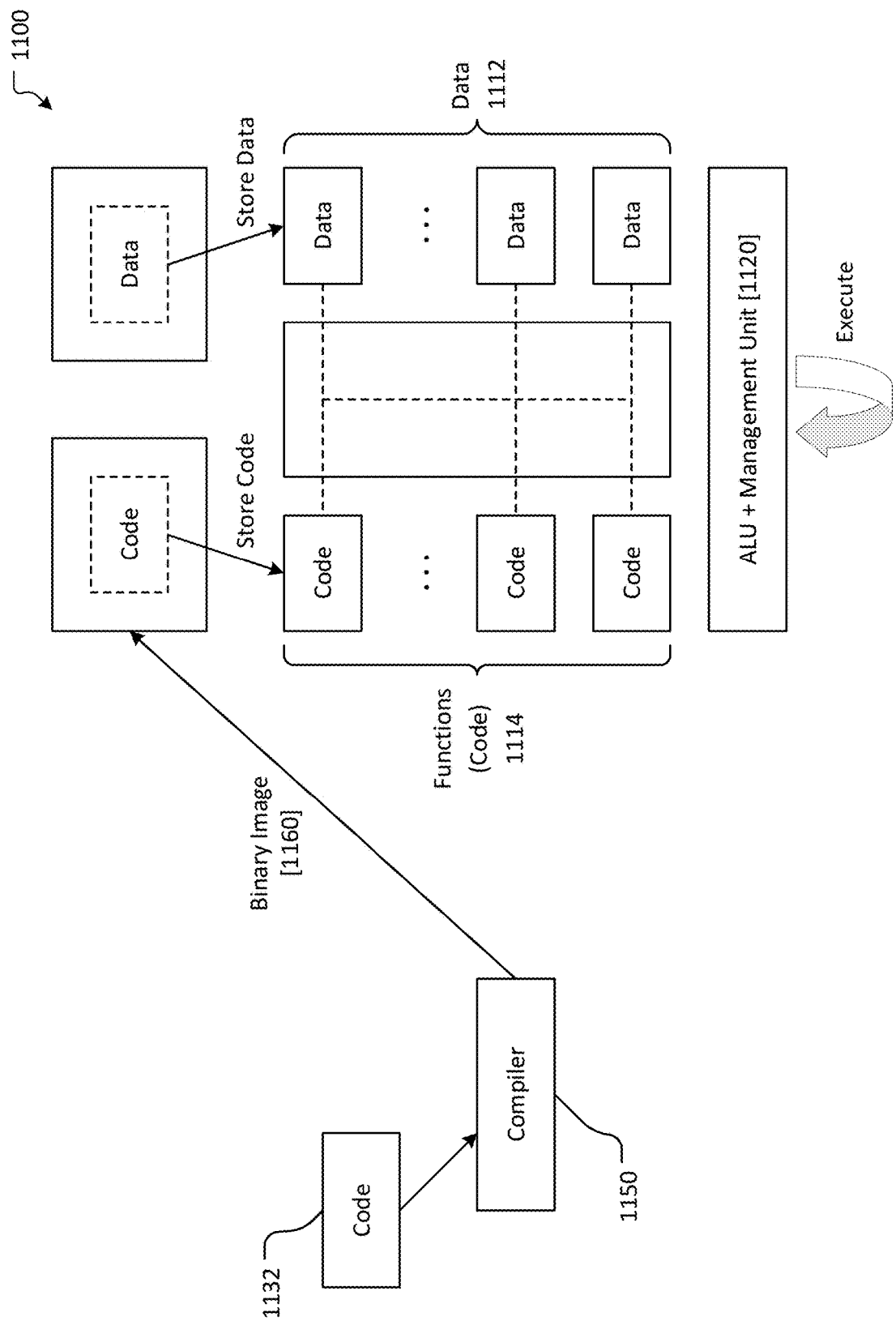
FIG. 11 is a schematic diagram illustrating an example model of data processing execution, according to some aspects described herein.

FIG. 11 is a schematic diagram illustrating another example model 1100 of data processing execution, according to some aspects described herein. The example model 1100 may be implemented in any of the example system architectures 500, 600, or 700 shown in FIGS. 5-7 and described in detail above. In one example, the data processing execution model 1100 allows for data to be easily changed without the need for recompiling the code 1132. As shown in the example model 1100, the compiler 1150 prepares a binary image 1160 with code lines 1114 in memory page(s). In one example, the memory pages are stored with code lines 1114. As a result, code lines 1114 can be stored once and be used for execution many times without the need to write it with data lines 1112, In such a configuration, only data lines 1112 need to be written into memory to start code execution. Additionally, the write operation in data lines 1112 is finished only after ending the code execution in all code lines 1114.

Figure 12:
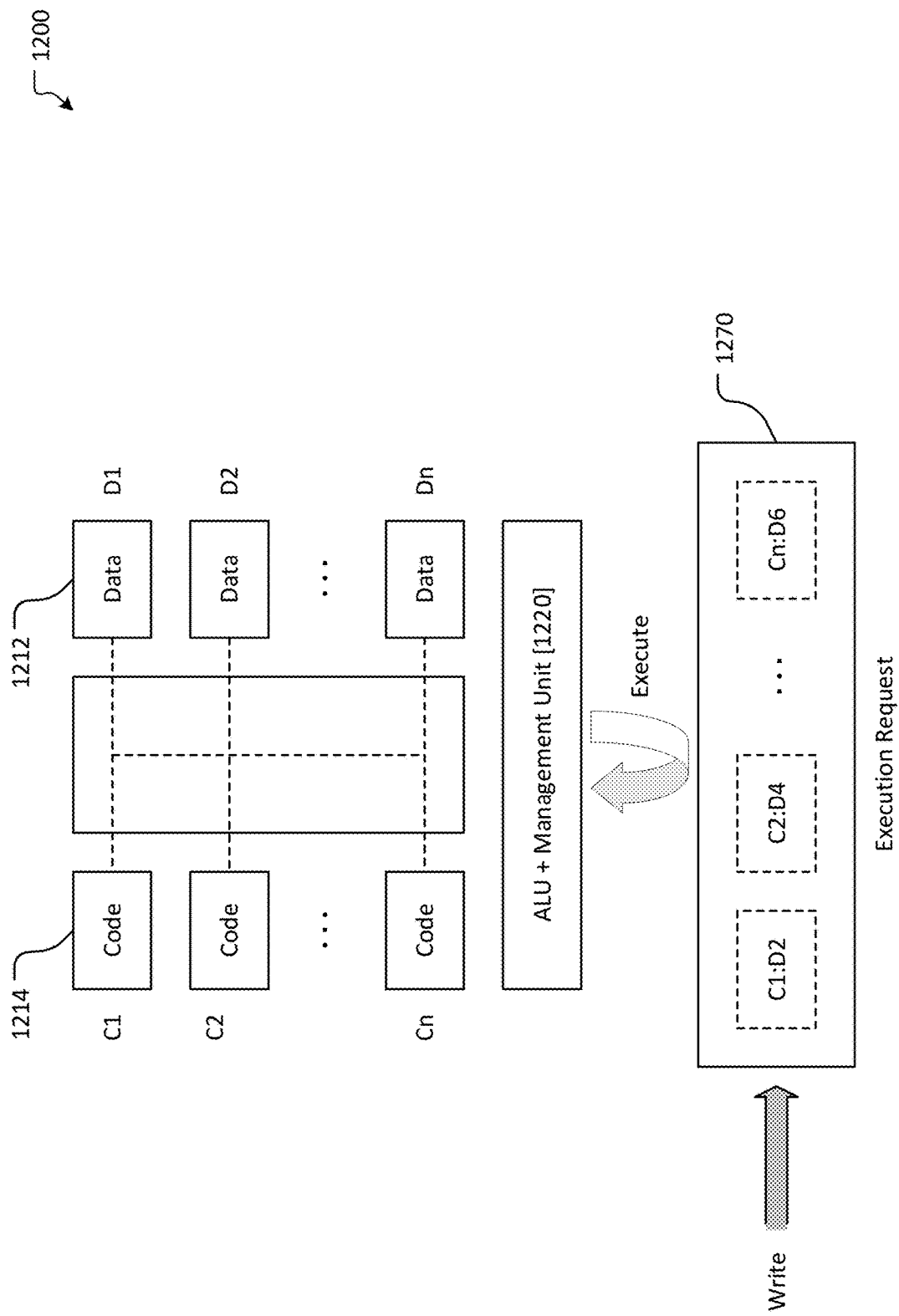
FIG. 12 is a schematic diagram illustrating an example model of data processing execution, according to some aspects described herein.

FIG. 12 is a schematic diagram illustrating another example model 1200 of data processing execution, according to some aspects described herein. The example model 1200 may be implemented in any of the example system architectures 500, 600, or 700 shown in FIGS. 5-7 and described in detail above. In the example model 1200, code lines 1214 and data lines 1212 may be stored in advance such that the data processing execution does not require any write operations of code or data. In such a configuration, code and data is already in persistent memory and was stored ahead of time as a part of regular write operations. In an example, neuromorphic memory can contain set of queues or designated memory pages (or lines) 1270 that can receive execution requests as a write operation. In such an example, an execution request defines an association of code lines 1214 and data lines 1212, and the sequence of operations. A host device can prepare memory page(s) with execution requests and write operation of such memory page(s) implies the necessity to execute code in the requested code lines 1214. The write operation is finished only after ending the code execution in all requested code lines 1214.

Figure 13:
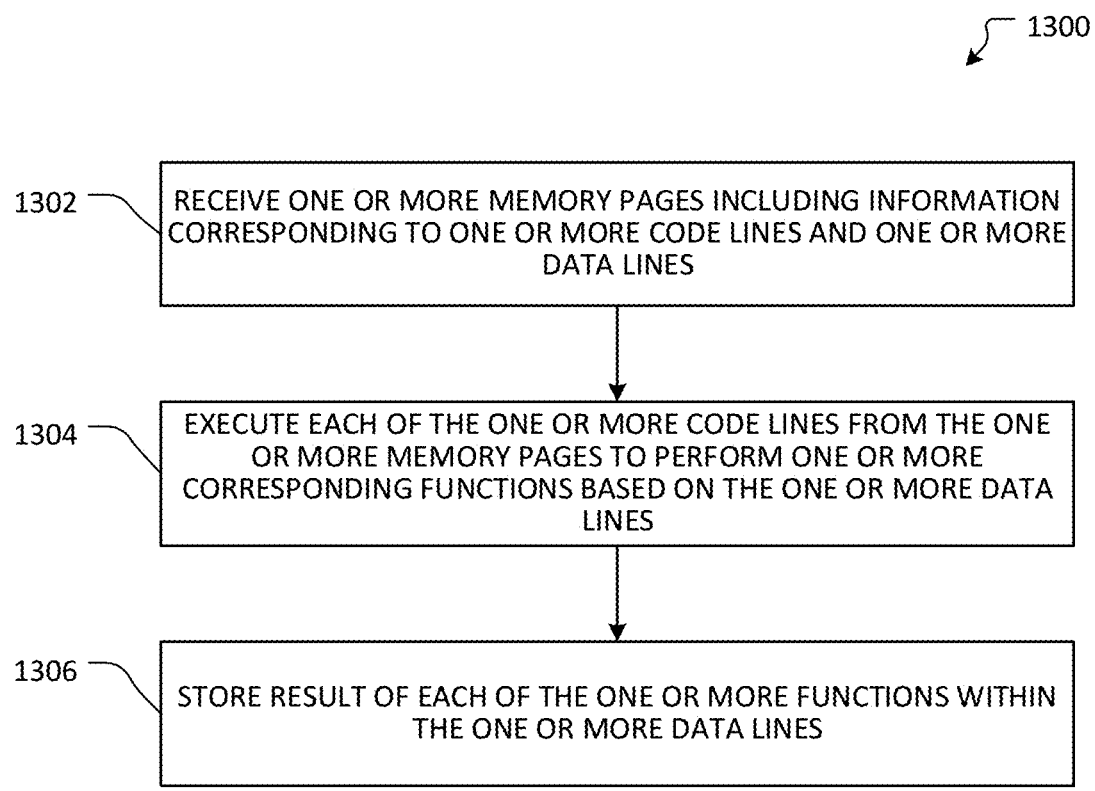
FIG. 13 illustrates a process for superposition of multiple commands according to some aspects described herein.

FIG. 13 illustrates an example process 1300 for superposition of multiple commands according to some aspects described herein. In examples, aspects of method 1300 may be performed by a system, such as system 100, 300, 400, 500, 600, or 700 discussed earlier herein with respect to FIGS. 1 and 3-7.

Process 1300 begins at operation 1302, where one or more memory pages may be received, and the one or more memory pages include information corresponding to one or more code lines (e.g., one or more of code lines 514, 614, 714, 814, 914, 1014, 1114, or 1214 in FIGS. 5-12) and one or more data lines (e.g., one or more of data lines 512, 612, 712, 812, 912, 1012, 1112, or 1212 in FIGS. 5-12). In an embodiment, the one or more code lines may correspond to a first set of layers (e.g., layers 608 in FIG. 6) in a memory layer (e.g., memory layer 404 in FIG. 4). The one or more code lines may be configured to execute one or more functions. In an embodiment, the one or more data lines may correspond to a second set of layers in the memory layer and may be configured to store one or more sets of data.

At operation 1304, each of the one or more code lines from the one or more memory pages may be executed. In an example, the one or more code lines may be expected to perform one or more corresponding functions, based on the one or more data lines from the one or more memory pages.

At operation 1306, a result of each of the one or more functions may be stored within the one or more data lines.

Figure 14:
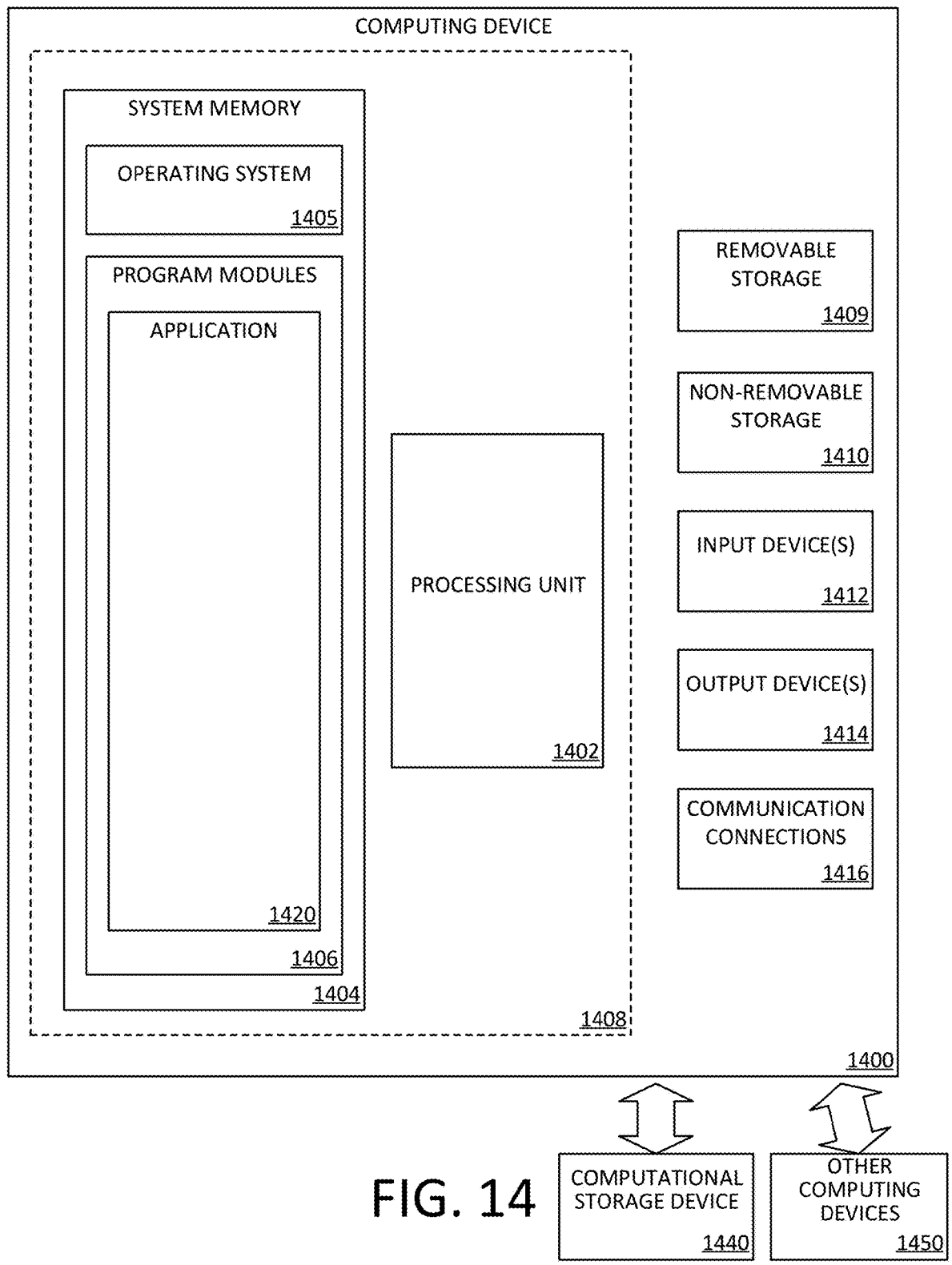
FIG. 14 is a block diagram illustrating physical components of a computing device with which aspects of the disclosure may be practiced.
Figure 15A:
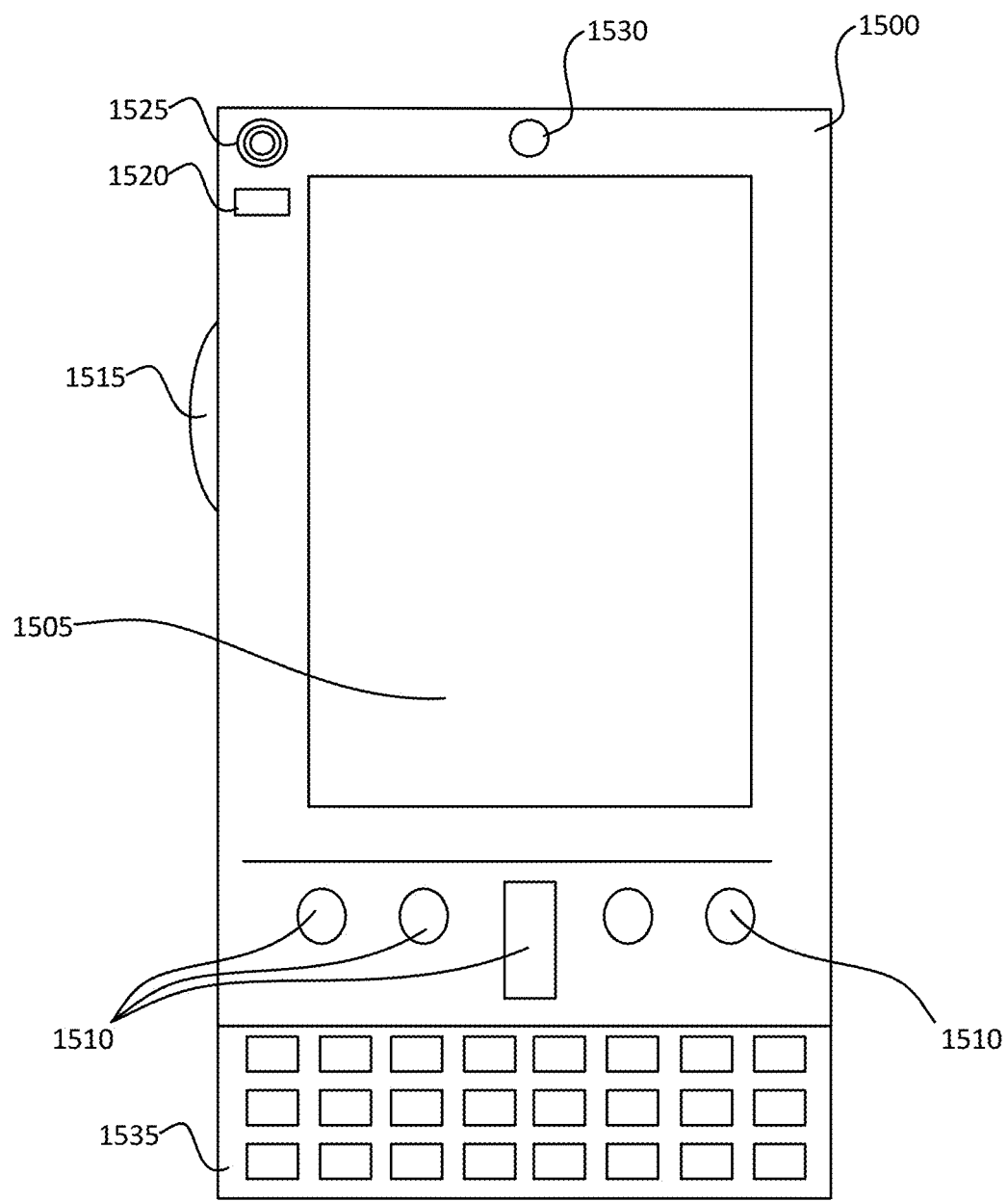
FIG. 15A illustrates a mobile computing device with which embodiments of the disclosure may be practiced.
Figure 15B:
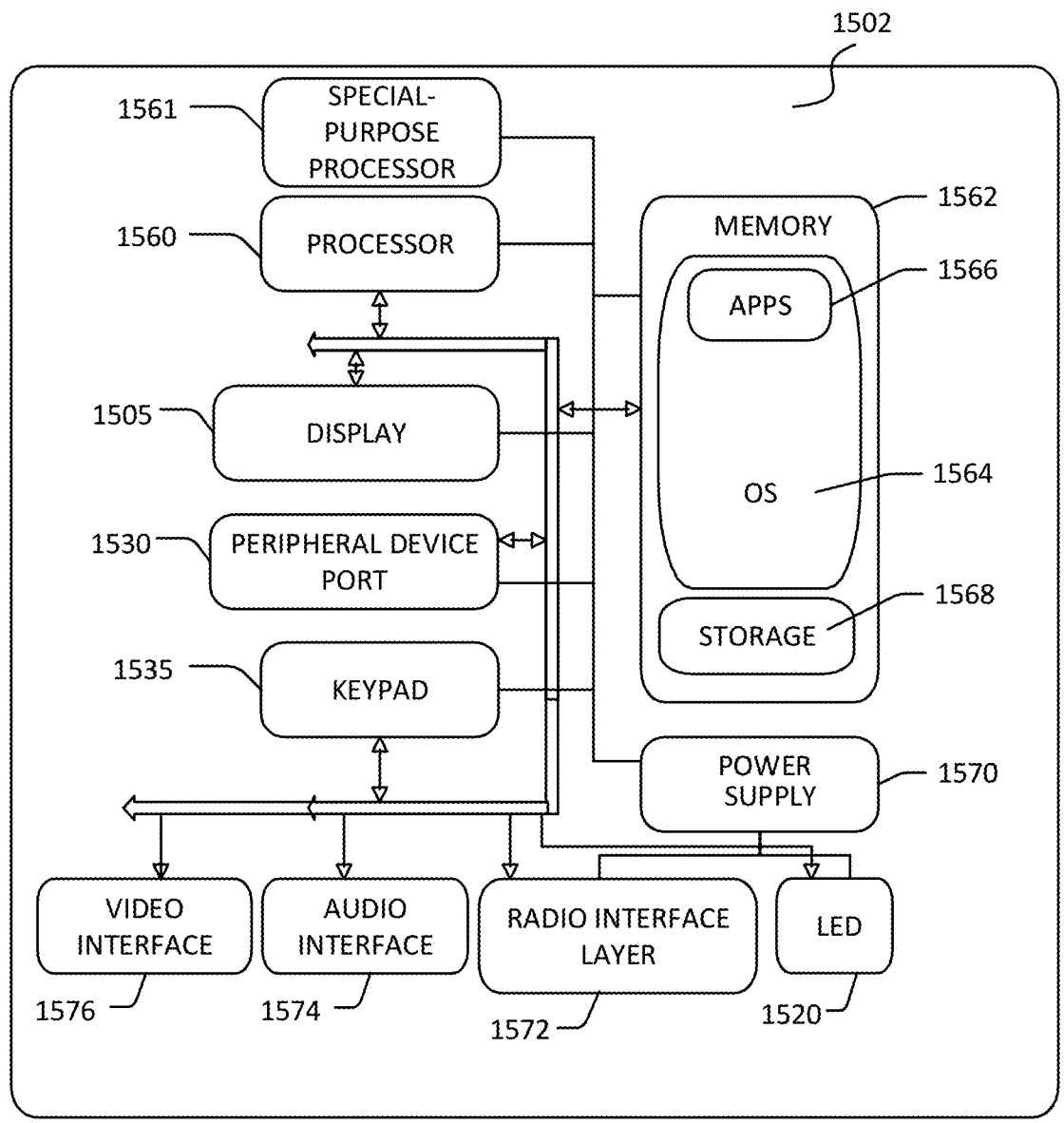
FIG. 15B is a block diagram illustrate the architecture of one aspect of a mobile computing device.
Figure 16:
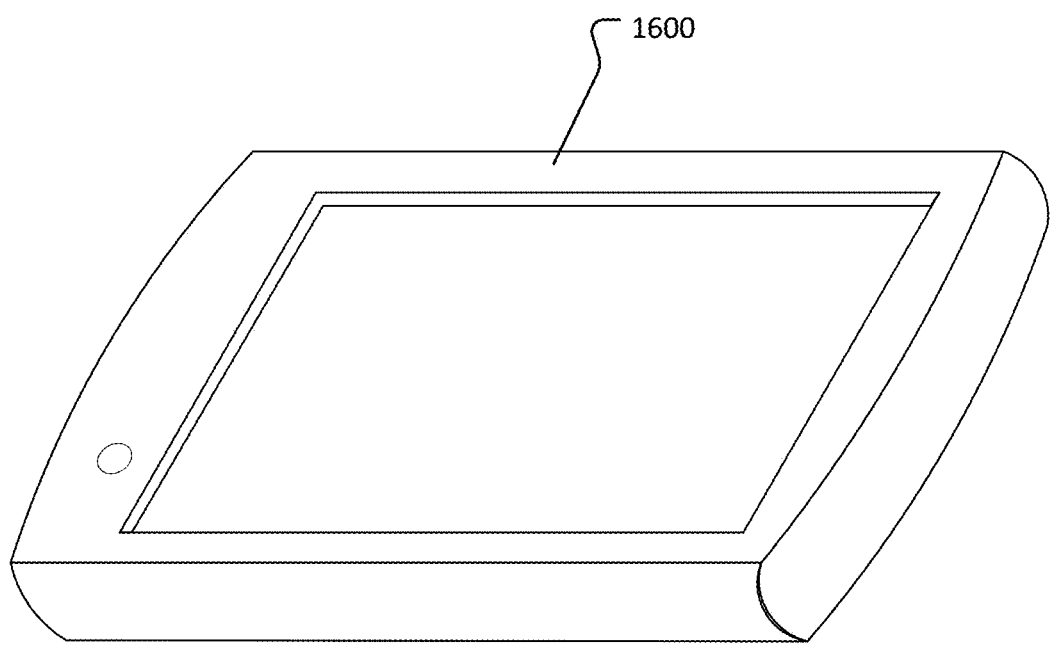
FIG. 16 illustrates an exemplary tablet computing device that may execute one or more aspects disclosed herein.

FIGS. 14-16 and the associated descriptions provide a discussion of a variety of operating environments in which aspects of the disclosure may be practiced. However, the devices and systems illustrated and discussed with respect to FIGS. 14-16 are for purposes of example and illustration and are not limiting of a vast number of computing device configurations that may be utilized for practicing aspects of the disclosure, described herein.

FIG. 14 is a block diagram illustrating physical components (e.g., hardware) of a computing device 1400 with which aspects of the disclosure may be practiced. The computing device components described below may be suitable for the computing devices described above, including host devices and file systems 102, 202, 232, 262, 302, 402, 602, 712, 812, 1112, 1212, and 1312 discussed with respect to FIGS. 1-13. In a basic configuration, the computing device 1400 may include at least one processing unit 1402 and a system memory 1404. Depending on the configuration and type of computing device, the system memory 1404 may comprise, but is not limited to, volatile storage (e.g., random access memory), non-volatile storage (e.g., read-only memory), flash memory, or any combination of such memories.

The system memory 1404 may include an operating system 1405 and one or more program modules 1406 suitable for running software application 1420, such as one or more components supported by the systems described herein. The operating system 1405, for example, may be suitable for controlling the operation of the computing device 1400.

Furthermore, embodiments of the disclosure may be practiced in conjunction with a graphics library, other operating systems, or any other application program and is not limited to any particular application or system. This basic configuration is illustrated in FIG. 14 by those components within a dashed line 1408. The computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by a removable storage device 1409 and a non-removable storage device 1410.

As stated above, a number of program modules and data files may be stored in the system memory 1404. While executing on the processing unit 1402, the program modules 1406 (e.g., application 1420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1400 may also have one or more input device(s) 1412 such as a keyboard, a mouse, a pen, a sound or voice input device, a touch or swipe input device, etc. The output device(s) 1414 such as a display, speakers, a printer, etc. may also be included. The aforementioned devices are examples and others may be used. The computing device 1700 may include one or more communication connections 1416 allowing communications with other computing devices 1450 or computational storage devices 1440. Examples of suitable communication connections 1416 include, but are not limited to, radio frequency (RF) transmitter, receiver, and/or transceiver circuitry; universal serial bus (USB), parallel, and/or serial ports. The computational storage devices 1440 may be similar to the computational storage devices 104, 204, 234, 264, 304, 404, 504, 604, 1004, 1104, and 1204 discussed with respect to FIGS. 1-12.

The term computer readable media as used herein may include computer storage media. Computer storage media may include volatile and nonvolatile, removable and non-removable media implemented in any method or technology for storage of information, such as computer readable instructions, data structures, or program modules. The system memory 1404, the removable storage device 1409, and the non-removable storage device 1410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 1400. Any such computer storage media may be part of the computing device 1400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 15A and 15B illustrate a mobile computing device 1500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 15A, one aspect of a mobile computing device 1500 for implementing the aspects is illustrated. In a basic configuration, the mobile computing device 1500 is a handheld computer having both input elements and output elements. The mobile computing device 1500 typically includes a display 1505 and one or more input buttons 1510 that allow the user to enter information into the mobile computing device 1500. The display 1505 of the mobile computing device 1500 may also function as an input device (e.g., a touch screen display).

If included, an optional side input element 1515 allows further user input. The side input element 1515 may be a rotary switch, a button, or any other type of manual input element. In alternative aspects, mobile computing device 1500 may incorporate more or less input elements. For example, the display 1505 may not be a touch screen in some embodiments.

In yet another alternative embodiment, the mobile computing device 1500 is a portable phone system, such as a cellular phone. The mobile computing device 1500 may also include an optional keypad 1535. Optional keypad 1535 may be a physical keypad or a "soft" keypad generated on the touch screen display.

In various embodiments, the output elements include the display 1505 for showing a graphical user interface (GUI), a visual indicator 1520 (e.g., a light emitting diode), and/or an audio transducer 1525 (e.g., a speaker). In some aspects, the mobile computing device 1500 incorporates a vibration transducer for providing the user with tactile feedback. In yet another aspect, the mobile computing device 1500 incorporates input and/or output ports, such as an audio input (e.g., a microphone jack), an audio output (e.g., a headphone jack), and a video output (e.g., a HDMI port) for sending signals to or receiving signals from an external device.

FIG. 15B is a block diagram illustrating the architecture of one aspect of a mobile computing device. That is, the mobile computing device 1500 can incorporate a system (e.g., an architecture) 1502 to implement some aspects. In one embodiment, the system 1502 is implemented as a "smart phone" capable of running one or more applications (e.g., browser, e-mail, calendaring, contact managers, messaging clients, games, and media clients/players). In some aspects, the system 1502 is integrated as a computing device, such as an integrated personal digital assistant (PDA) and wireless phone.

One or more application programs 1566 may be loaded into the memory 1562 and run on or in association with the operating system 1564. Examples of the application programs include phone dialer programs, e-mail programs, personal information management (PIM) programs, word processing programs, spreadsheet programs, Internet browser programs, messaging programs, and so forth. The system 1502 also includes a non-volatile storage area 1568 within the memory 1562. The non-volatile storage area 1568 may be used to store persistent information that should not be lost if the system 1502 is powered down. The application programs 1566 may use and store information in the nonvolatile storage area 1568, such as e-mail or other messages used by an e-mail application, and the like. A synchronization application (not shown) also resides on the system 1502 and is programmed to interact with a corresponding synchronization application resident on a host computer to keep the information stored in the non-volatile storage area 1568 synchronized with corresponding information stored at the host computer. As should be appreciated, other applications may be loaded into the memory 1562 and run on the mobile computing device 1500 described herein (e.g., a signal identification component, a gaze tracker component, a shared computing component, etc.).

The system 1502 has a power supply 1570, which may be implemented as one or more batteries. The power supply 1570 might further include an external power source, such as an AC adapter or a powered docking cradle that supplements or recharges the batteries.

The system 1502 may also include a radio interface layer 1572 that performs the function of transmitting and receiving radio frequency communications. The radio interface layer 1572 facilitates wireless connectivity between the system 1502 and the "outside world," via a communications carrier or service provider. Transmissions to and from the radio interface layer 1572 are conducted under control of the operating system 1564. In other words, communications received by the radio interface layer 1572 may be disseminated to the application programs 1566 via the operating system 1564, and vice versa.

The visual indicator 1520 may be used to provide visual notifications, and/or an audio interface 1574 may be used for producing audible notifications via the audio transducer 1525. In the illustrated embodiment, the visual indicator 1520 is a light emitting diode (LED) and the audio transducer 1525 is a speaker. These devices may be directly coupled to the power supply 1570 so that when activated, they remain on for a duration dictated by the notification mechanism even though the processor 1560 and/or special-purpose processor 1561 and other components might shut down for conserving battery power. The LED may be programmed to remain on indefinitely until the user takes action to indicate the powered-on status of the device. The audio interface 1574 is used to provide audible signals to and receive audible signals from the user. For example, in addition to being coupled to the audio transducer 1525, the audio interface 1574 may also be coupled to a microphone to receive audible input, such as to facilitate a telephone conversation. In accordance with embodiments of the present disclosure, the microphone may also serve as an audio sensor to facilitate control of notifications, as will be described below. The system 1502 may further include a video interface 1576 that enables an operation of an on-board camera 1530 to record still images, video stream, and the like.

A mobile computing device 1500 implementing the system 1502 may have additional features or functionality. For example, the mobile computing device 1500 may also include additional data storage devices (removable and/or non-removable) such as, magnetic disks, optical disks, or tape. Such additional storage is illustrated in FIG. 15B by the non-volatile storage area 1568.

Data/information generated or captured by the mobile computing device 1500 and stored via the system 1502 may be stored locally on the mobile computing device 1500, as described above, or the data may be stored on any number of storage media that may be accessed by the device via the radio interface layer 1572 or via a wired connection between the mobile computing device 1500 and a separate computing device associated with the mobile computing device 1500, for example, a server computer in a distributed computing network, such as the Internet. As should be appreciated such data/information may be accessed via the mobile computing device 1500 via the radio interface layer 1572 or via a distributed computing network. Similarly, such data/information may be readily transferred between computing devices for storage and use according to well-known data/information transfer and storage means, including electronic mail and collaborative data/information sharing systems.

FIG. 16 illustrates an exemplary tablet computing device 1600 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In accordance with at least one example of the present disclosure, a system is described. In examples, the system may include a logic layer comprising an arithmetic logic unit (ALU) and a memory layer comprising a first set of layers and a second set of layers. In examples, the first set of layers corresponds to one or more code lines, the one or more code lines being configured to execute one or more functions, and the second set of layers corresponds to one or more data lines, the one or more data lines being configured to store one or more sets of data. In examples, the memory layer stores instructions that, when executed by the logic layer, cause the system to perform a first set of operations, the first set of operations comprising: receiving one or more memory pages including information corresponding to one or more of the one or more code lines and one or more of the one or more data lines; executing each of the one or more of the one or more code lines from the one or more memory pages, to perform one or more corresponding functions, based on the one or more of the one or more data lines from the one or more memory pages; and storing a result of each of the one or more functions, within the one or more data lines.

In accordance with at least one aspect of the above example, each memory page includes 32 code lines and 32 data lines.

In accordance with at least one aspect of the above example, each memory page includes either a plurality of code lines or a plurality of data lines.

In accordance with at least one aspect of the above example, each of the one or more code lines comprise a stack and a code instruction area.

In accordance with at least one aspect of the above example, one or more of the one or more code lines and one or more of the one or more data lines are stored in the memory layer, before the one or more functions are performed.

In accordance with at least one aspect of the above example, the memory layer comprises persistent memory.

In accordance with at least one aspect of the above example, the logic layer, the first set of layers, and the second set of layers are connected through an interconnection network.

In accordance with at least one aspect of the above example, the system further comprises a device, the device comprising: at least one processor; and device memory storing instructions that, when executed by the at least one processor, cause the device to perform a second set of operations, the second set of operations comprising: preparing a binary image with the one or more of the one or more code lines in the one or more memory pages; and storing the binary image in the device memory, for the memory layer to receive the one or more memory pages therefrom.

In accordance with at least one aspect of the above example, the device is a host device, and the logic layer and the memory layer form, at least in part, a storage device that is coupled to, or otherwise in communication with, the host device.

In accordance with at least one other example of the present disclosure, a method is described. The method may include receiving one or more memory pages including information corresponding to one or more code lines and one or more data lines, the one or more code lines corresponding to a first set of layers in a memory layer and being configured to execute one or more functions, and the one or more data lines corresponding to a second set of layers in the memory layer and being configured to store one or more sets of data; executing each of the one or more code lines from the one or more memory pages, to perform one or more corresponding functions, based on the one or more data lines from the one or more memory pages; and storing a result of each of the one or more functions, within the one or more data lines.

In accordance with at least one aspect of the above example, each memory page includes at least 32 code lines and at least 32 data lines.

In accordance with at least one aspect of the above example, each memory page includes either a plurality of code lines or a plurality of data lines.

In accordance with at least one aspect of the above example, each of the one or more code lines comprise a stack and a code instruction area.

In accordance with at least one aspect of the above example, one or more of the one or more code lines and one or more of the one or more data lines are stored in the memory layer, before the one or more functions are performed.

In accordance with at least one aspect of the above example, the memory layer comprises persistent memory.

In accordance with at least one aspect of the above example, the second set of layers are connected through an interconnection network.

In accordance with at least one aspect of the above example, the first set of layers and the second set of layers are connected through the interconnection network to a logic layer comprising an arithmetic logic unit (ALU).

In accordance with at least one aspect of the above example, the method further comprises: preparing, via a device comprising at least one processor and device memory, a binary image with the one or more code lines in the one or more memory pages; and storing the binary image in the device memory, for the memory layer to receive the one or more memory pages therefrom.

In accordance with at least one aspect of the above example, the device is a host device, and wherein a logic layer and the memory layer form, at least in part, a storage device that is coupled to, or otherwise in communication with, the host device.

In accordance with at least one other example of the present disclosure, a non-transitory computer-readable storage medium is described. The non-transitory computer-readable storage medium stores computer-readable instructions that upon execution by a processor cause the processor to implement operations comprising: receiving one or more memory pages including information corresponding to one or more code lines and one or more data lines, the one or more code lines corresponding to a first set of layers in a memory layer and being configured to execute one or more functions, and the one or more data lines corresponding to a second set of layers in the memory layer and being configured to store one or more sets of data; executing each of the one or more code lines from the one or more memory pages, to perform one or more corresponding functions, based on the one or more data lines from the one or more memory pages; and storing a result of each of the one or more functions, within the one or more data lines.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    a logic layer comprising an arithmetic logic unit (ALU); and
    a memory layer comprising a first set of layers and a second set of layers, the first set of layers corresponding to one or more code lines, the one or more code lines being configured to execute one or more functions, and the second set of layers corresponding to one or more data lines, the one or more data lines being configured to store one or more sets of data,
    wherein the memory layer storing instructions that, when executed by the logic layer, cause the system to perform a first set of operations, the first set of operations comprising:

receiving one or more memory pages including information corresponding to one or more of the one or more code lines and one or more of the one or more data lines;

executing each of the one or more of the one or more code lines from the one or more memory pages, to perform one or more corresponding functions, based on the one or more of the one or more data lines from the one or more memory pages; and storing a result of each of the one or more functions, within the one or more data lines, and wherein the system further comprising:

at least one processor; and device memory storing instructions that, when executed by at least one processor, cause a device to perform a second set of operations, the second set of operations comprising:

preparing, by a compiler, a binary image with the one or more of the one or more code lines in the one or more memory pages, the binary image including executable code without the data in the one or more memory pages;

storing the binary image once in the device memory;

executing the one or more code lines of the binary image; and for each code line executed, writing one or more data lines corresponding the code line in the device memory from the one or more memory pages.

2. The system of claim 1, wherein each memory page includes at least 32 code lines and at least 32 data lines.

3. The system of claim 1, wherein each memory page includes a plurality of code lines and a plurality of data lines.

4. The system of claim 1, wherein each of the one or more code lines comprise a stack and a code instruction area.

5. The system of claim 1, wherein one or more of the one or more code lines and one or more of the one or more data lines are stored in the memory layer, before the one or more functions are performed.

6. The system of claim 1, wherein the memory layer comprises persistent memory.

7. The system of claim 1, wherein the logic layer, the first set of layers, and the second set of layers are connected through an interconnection network.

8. The system of claim 1, wherein the device is a host device, and wherein the logic layer and the memory layer form, at least in part, a storage device that is coupled to, or otherwise in communication with, the host device.

9. A method comprising:

receiving one or more memory pages including information corresponding to one or more code lines and one or more data lines, the one or more code lines corresponding to a first set of layers in a memory layer and being configured to execute one or more functions, and the one or more data lines corresponding to a second set of layers in the memory layer and being configured to store one or more sets of data;

executing each of the one or more code lines from the one or more memory pages, to perform one or more corresponding functions, based on the one or more data lines from the one or more memory pages;

storing a result of each of the one or more functions, within the one or more data lines;

preparing, by a compiler via a device comprising at least one processor and device memory, a binary image with the one or more code lines in the one or more memory pages, the binary image including executable code without the data in the one or more memory pages;

storing the binary image once in the device memory;

executing the one or more code lines of the binary image; and for each code line executed, writing one or more data lines corresponding the code line in the device memory from the one or more memory pages.

10. The method of claim 9, wherein each memory page includes at least 32 code lines and at least 32 data lines.

11. The method of claim 9, wherein each memory page includes a plurality of code lines and a plurality of data lines.

12. The method of claim 9, wherein each of the one or more code lines comprise a stack and a code instruction area.

13. The method of claim 9, wherein one or more of the one or more code lines and one or more of the one or more data lines are stored in the memory layer, before the one or more functions are performed.

14. The method of claim 9, wherein the memory layer comprises persistent memory.

15. The method of claim 9, wherein the first set of layers and the second set of layers are connected through an interconnection network.

16. The method of claim 15, wherein the first set of layers and the second set of layers are connected through the interconnection network to a logic layer comprising an arithmetic logic unit (ALU).

17. The method of claim 9, wherein the device is a host device, and wherein a logic layer and the memory layer form, at least in part, a storage device that is coupled to, or otherwise in communication with, the host device.

18. A non-transitory computer-readable storage medium, storing computer-readable instructions that upon execution by a processor cause the processor to implement operations, the operations comprising:

receiving one or more memory pages including information corresponding to one or more code lines and one or more data lines, the one or more code lines corresponding to a first set of layers in a memory layer and being configured to execute one or more functions, and the one or more data lines corresponding to a second set of layers in the memory layer and being configured to store one or more sets of data;

executing each of the one or more code lines from the one or more memory pages, to perform one or more corresponding functions, based on the one or more data lines from the one or more memory pages;

storing a result of each of the one or more functions, within the one or more data lines;

preparing, by a compiler via a device comprising at least one processor and device memory, a binary image with the one or more code lines in the one or more memory pages, the binary image including executable code without the data in the one or more memory pages;

storing the binary image once in the device memory;

executing the one or more code lines of the binary image; and for each code line executed, writing one or more data lines corresponding the code line in the device memory from the one or more memory pages.

19. The non-transitory computer-readable storage medium of claim 18, wherein each memory page includes a plurality of code lines and a plurality of data lines.

20. The non-transitory computer-readable storage medium of claim 18, wherein the device is a host device, and wherein a logic layer and the memory layer form, at least in part, a storage device that is coupled to, or otherwise in communication with, the host device.

* * * * *